United States Patent
Bathen et al.

(10) Patent No.: US 12,368,589 B2
(45) Date of Patent: Jul. 22, 2025

(54) METHOD TO VALIDATE OWNERSHIP AND AUTHENTICATION OF A DIGITAL ASSET

(71) Applicant: International Business Machines Corporation, Armonk, NY (US)

(72) Inventors: Luis Angel Bathen, San Jose, CA (US); Eric Kevin Butler, San Jose, CA (US); Marc Henri Coq, Hopewell Junction, NY (US); Cedric D. Cook, Richmond, TX (US); Akil Khamisi Sutton, Poughkeepsie, NY (US); Sandra C Thompson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 18/058,290

(22) Filed: Nov. 23, 2022

(65) Prior Publication Data
US 2024/0171393 A1    May 23, 2024

(51) Int. Cl.
*H04L 9/00*    (2022.01)
*H04L 9/08*    (2006.01)
(Continued)

(52) U.S. Cl.
CPC .............. *H04L 9/30* (2013.01); *H04L 9/0825* (2013.01); *H04L 9/3236* (2013.01); *H04L 2209/603* (2013.01)

(58) Field of Classification Search
CPC ............ H04L 2209/603; H04L 9/3236; H04L 9/0825; H04L 9/30; H04L 9/00;
(Continued)

(56) References Cited

U.S. PATENT DOCUMENTS

| | | |
|---|---|---|
| 11,348,152 B1 | 5/2022 | Davis |
| 2017/0116693 A1* | 4/2017 | Rae ............... G06Q 50/184 |

(Continued)

FOREIGN PATENT DOCUMENTS

| | | |
|---|---|---|
| CN | 109075968 A | 12/2018 |
| CN | 110692214 A | 1/2020 |

(Continued)

OTHER PUBLICATIONS

"Patent Cooperation Treaty PCT Notification of Transmittal of the International Search Report and the Written Opinion of the International Searching Authority, or the Declaration", International application No. PCT/CN2023/131187, International filing date Nov. 13, 2023, Date of mailing Feb. 22, 2024, 8 pages.

(Continued)

*Primary Examiner* — Josnel Jeudy
(74) *Attorney, Agent, or Firm* — Stephen R. Yoder

(57) ABSTRACT

A computer-implemented method for validating ownership of a digital asset is disclosed. The computer-implemented method includes transmitting a public key for encrypting a digital asset to an owner of the digital asset responsive to receiving a request for the public key. The computer-implemented method further includes receiving from the owner of the digital asset, an encrypted digital asset and a first liveness hash, wherein the digital asset is encrypted using the public key, and the first liveness hash is generated based, at least in part, on the digital asset in an unencrypted form and a first nonce. The computer-implemented method further includes determining whether the first liveness hash is valid. The computer-implemented method further includes generating in response to determining that the first liveness hash is valid, a digital asset record, wherein the digital asset record includes the encrypted digital asset and the first liveness hash.

22 Claims, 16 Drawing Sheets

(51) Int. Cl.
*H04L 9/30* (2006.01)
*H04L 9/32* (2006.01)

(58) Field of Classification Search
CPC ..... H04L 9/06; H04L 9/08; H04L 9/32; G06F 21/00; G06F 21/10; G06F 21/60
USPC ........................................................ 380/277
See application file for complete search history.

(56) References Cited

U.S. PATENT DOCUMENTS

| | | | |
|---|---|---|---|
| 2017/0317834 A1 | 11/2017 | Smith | |
| 2020/0169407 A1* | 5/2020 | Wei | H04L 63/10 |
| 2020/0242105 A1 | 7/2020 | Rich | |
| 2021/0097508 A1 | 4/2021 | Papanikolas | |
| 2021/0248214 A1 | 8/2021 | Goldston | |
| 2022/0337392 A1* | 10/2022 | Schauer | H04L 9/3247 |
| 2023/0370275 A1* | 11/2023 | Aspler-Yaskil | H04L 9/50 |
| 2024/0273167 A1* | 8/2024 | Novelli | G06F 21/108 |

FOREIGN PATENT DOCUMENTS

| | | | | |
|---|---|---|---|---|
| CN | 113159950 A | 7/2021 | | |
| CN | 114037435 A | 2/2022 | | |
| CN | 114037529 A | 2/2022 | | |
| CN | 114565378 A | 5/2022 | | |
| CN | 114581104 A | 6/2022 | | |
| KR | 101887964 B1 | 8/2018 | | |
| KR | 102322511 B1 | 11/2021 | | |
| WO | WO-0188674 A2 * | 11/2001 | | G06F 15/00 |
| WO | WO-2018222202 A1 * | 12/2018 | | G06F 21/64 |

OTHER PUBLICATIONS

Vongpradhip et al. "QR code using invisible watermarking in frequency domain", Ninth International Conference on ICT and Knowledge Engineering, Jan. 2012, 6 pages.

"Bitcoin QR Code Maker", Bitcoin QR, downloaded from the Internet on Aug. 17, 2022, 15 pages, <https://www.bitcoinqrcodemaker.com/#lapi_quick_start_guide >.

"DeviantArt Protect: Helping Deviants Like You", Sep. 21, 2021, team, 6 pages, <https://www.deviantart.com/team/journal/DeviantArt-Protect-Helping-Deviants-Like-You-891290511>.

Williams, Leah J., "DeviantArt is Using AI to Alert Artists When Their Work is Stolen For NFTs", Sep. 13, 2021, GIZMODO, 7 pages, <https://www.gizmodo.com.au/2021/09/deviantart-ai-stolen-nfts-artists/>.

Yoder, Madison, "An 'OpenSea' of Infringement: The Intellectual Property Implications of NFTs," The University of Cincinnati Intellectual Property and Computer Law Journal, vol. 6, Issue 2, Article 4, Apr. 2022, 15 pages.

* cited by examiner

990

Block$_i$

Header 972$_i$

- Hash Value of Previous Block
- Reference Information

File(s) (and Metadata) 974$_i$

| Data 1 | REF 1 | Metadata 1 |
| Data 2 | REF 2 | Metadata 2 |
| . | . | . |
| . | . | . |
| . | . | . |
| . | . | . |
| . | . | . |
| Data N | REF N | Metadata N |

Value 976$_i$ (based on one or more of)

- New Hash Value of File
- New Storage Location of File
- New Metadata Assigned to File
- Transfer Access/Control to New Blockchain Participant
- New/Existing/Change of Ownership of the File

FIG. 9D

METHOD TO VALIDATE OWNERSHIP AND AUTHENTICATION OF A DIGITAL ASSET

BACKGROUND

The present invention relates generally to the field of digital assets, and more particularly to, authenticating a digital asset and validating the ownership of a digital asset.

Blockchain is a shared, immutable ledger that facilitates the process of recording transactions and tracking assets in a business network. An asset can be tangible (a house, car, cash, land) or intangible (intellectual property, patents, copyrights, branding). A non-fungible token (NFT) is a record on a blockchain which is associated with a particular digital or physical asset. NFT minting is the process of taking a digital file and turning it into a digital asset that can be stored on the blockchain. Once it becomes a digital asset, the NFT can be put into circulation, and it can be sold via smart contract. A smart contact is a computer program or a transaction protocol that is intended to automatically execute, control or document legally relevant events and actions according to the terms of a contract or an agreement. For example, when an NFT is transferred from one cryptocurrency wallet to another, the smart contract attached to the NFT is executed. A cryptocurrency wallet is a device, physical medium, program or a service which stores the public and/or private keys for cryptocurrency transactions. The ownership of an NFT is recorded in the blockchain, and can be transferred by the owner, allowing NFTs to be sold and traded.

During the minting process, the NFT is created when blockchains concatenate records containing cryptographic hashes—sets of characters that identify a set of data—onto previous records, creating a chain of identifiable data blocks. This cryptographic transaction process ensures the authentication of each digital asset by providing a digital signature that tracks the ownership of the NFT. Digital assets are often downloadable from a well-known repository. Digital assets can also be held, sold, traded, on offered for sale on many different platforms or marketplaces. Meaning, someone can take a digital asset from one platform and create a counterfeit of the image of the original digital asset on another platform or marketplace.

A cryptocurrency wallet is a device, physical medium, program or a service which stores the public and/or private keys for cryptocurrency transactions. A cryptocurrency wallet is accompanied by a public key and a private key. A public key works like an email address, meaning it can safely share it with others, allowing you to send or receive assets. However, a private key a secure code that enables the holder of a digital asset to make transactions and prove ownership of their digital assets. A private key is typically a string of letters and numbers. A public key allows you to receive cryptocurrency transactions. While anyone can send transactions to the public key, you need the private key to "unlock" them and prove that you are the owner of the cryptocurrency received in the transaction.

With the emergence of blockchain technology, content creators have been able to digitalize their creations and sell them in marketplaces as NFTs. One of the drawbacks of NFTs is that anyone can access the URL and download the asset from a repository using link in NFT. Then, they can mint a new NFT on anther NFT marketplace, claiming as the owner of the asset. The challenge then becomes proving true ownership of an asset.

US20200242105A1 describes "a distributed computing platform and method for creating actionable digital assets and tokens incorporating influence and outreach ("KNFT"). A KNFT application server may be configured to receive, over a distributed computing network from a remote computing node, a request for a new non-fungible token wherein the KNFT comprises a unique KNFT identifier, at least one metadata element, and least one social vector . . . Social actions may comprise user comment, connection, direct message, like, or favorable rating, and a change in ownership of the KNFT may be written to the social vector by a KNFT API. The social vector may comprise social vector data from at least one prior owner, and the KNFT may further comprise a circulation trail vector that incorporates the ownership history of the KNFT." This reference fails to solve the problem of providing a secured mechanism on a ledger to authenticate a digital asset transaction. Embodiments of the present invention are advantageous and recognize the need for and importance of a method that protects the digital asset by providing a secured mechanism for authenticating a digital asset transaction. Embodiments of the present invention solve this problem on a ledger by using a liveness hash for verification.

Another way to prevent digital asset fraud is checking against other registered or known marketplaces. Currently, NFTs are generated, and the metadata needed to download the original asset is often embedded as part of the NFT. Therefore, anyone with access to the metadata may be able to download the original asset. This opens up opportunities for forgery, counterfeit, among other vulnerabilities. Moreover, the assets themselves may be stored in some third-party website, which at some point may go out of business, which could result in the loss of the original asset. However, embodiments of the present invention recognize minting a digital asset with an encrypted image increases the likelihood of determining the authenticity of a digital asset.

Existing NFT creation and validation process are open to the public. Existing NFT minting process includes the image hash and the url of the image in an object store. Meaning, any person can validate a hash by the asset hash or address in the NFT and compute the hash to verify a match. Further, it is easy to commit NFT theft by copying the asset, creating a hash, and minting another NFT with the same image either to the same or a different platform. Embodiments of the present invention fix this problem by asset location and a liveness hash. Further, the referenced asset is encrypted. In embodiments of the present invention, ownership validation does not depend on data in the NFT. In embodiments of the present invention, the requester supplies a nonce and the owner repository perform a liveness hash in order to prove ownership.

SUMMARY

According to one embodiment of the present invention, a computer-implemented method for validating ownership of a digital asset is disclosed. The computer-implemented method includes transmitting, by one or more processors, a public key for encrypting a digital asset to an owner of the digital asset responsive to receiving a request for the public key. The computer-implemented method further includes receiving, by the one or more processors, from the owner of the digital asset, an encrypted digital asset and a first liveness hash, wherein the digital asset is encrypted using the public key, and the first liveness hash is generated based, at least in part, on the digital asset in an unencrypted form and a first nonce. The computer-implemented method further includes responsive to receiving, from the encrypted digital asset from the owner of the digital asset, the first nonce, and the first liveness hash, determining whether the first liveness hash is valid. The computer-implemented method further includes generating, by the one or more processors, in response to determining that the first liveness hash is valid, a digital asset record, wherein the digital asset record includes the encrypted digital asset and the first liveness hash. Embodiments of the present invention are advantageous for generating a liveness hash instead of a hash.

According to another embodiment of the present invention, a computer program product for validating ownership of a digital asset is disclosed. The computer program product includes one or more computer readable storage media and program instructions stored on the one or more computer readable storage media. The program instructions include instructions to transmit a public key for encrypting a digital asset to an owner of the digital asset responsive to receiving a request for the public key. The program instructions further include instructions to receive from the owner of the digital asset, an encrypted digital asset and a first liveness hash, wherein the digital asset is encrypted using the public key, and the first liveness hash is generated based, at least in part, on the digital asset in an unencrypted form and a first nonce. The program instructions further include instructions to responsive to receiving, from the encrypted digital asset from the owner of the digital asset, the first nonce, and the first liveness hash, determine whether the first liveness hash is valid. The program instructions further include instructions to generate in response to determining that the first liveness hash is valid, a digital asset record, wherein the digital asset record includes the encrypted digital asset and the first liveness hash. Embodiments of the present invention are advantageous for generating a liveness hash instead of a hash.

According to another embodiment of the present invention, a computer system for validating ownership of a digital asset is disclosed. The computer system includes one or more computer processors, one or more computer readable storage media, and computer program instructions, the computer program instructions being stored on the one or more computer readable storage media for execution by the one or more computer processors. The program instructions include instructions transmit a public key for encrypting a digital asset to an owner of the digital asset responsive to receiving a request for the public key. The program instructions further include instructions to receive from the owner of the digital asset, an encrypted digital asset and a first liveness hash, wherein the digital asset is encrypted using the public key, and the first liveness hash is generated based, at least in part, on the digital asset in an unencrypted form and a first nonce. The program instructions further include instructions to responsive to receiving, from the encrypted digital asset from the owner of the digital asset, the first nonce, and the first liveness hash, determine whether the first liveness hash is valid. The program instructions further include instructions to generate in response to determining that the first liveness hash is valid, a digital asset record, wherein the digital asset record includes the encrypted digital asset and the first liveness hash. Embodiments of the present invention are advantageous for generating a liveness hash instead of a hash.

According to another embodiment of the present invention, a computer-implemented method for validating ownership of a digital asset is disclosed. The computer-implemented method includes receiving, by the one or more processors, a request from a requesting entity for an owner of a digital asset to provide proof of ownership of the digital asset, wherein the request includes a first nonce. The computer-implemented method further includes responsive to receiving the request for the owner of the digital asset to provide proof of ownership of the digital asset. The computer-implemented method further includes transmitting, by the one or more processors, the first nonce to the owner of the digital asset. The computer-implemented method further includes receiving, by the one or more processors, from the owner of the digital asset, an image id associated with the digital image and a first liveness hash. The computer-implemented method further includes validating, by the one or more processors, proof of ownership of the digital asset. Embodiments of the present invention are advantageous for generating a liveness hash instead of a hash.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 9D illustrates a block which may represent the structure of blocks in the blockchain, generally designated 990, in accordance with at least one embodiment of the present disclosure.

Figure 1:
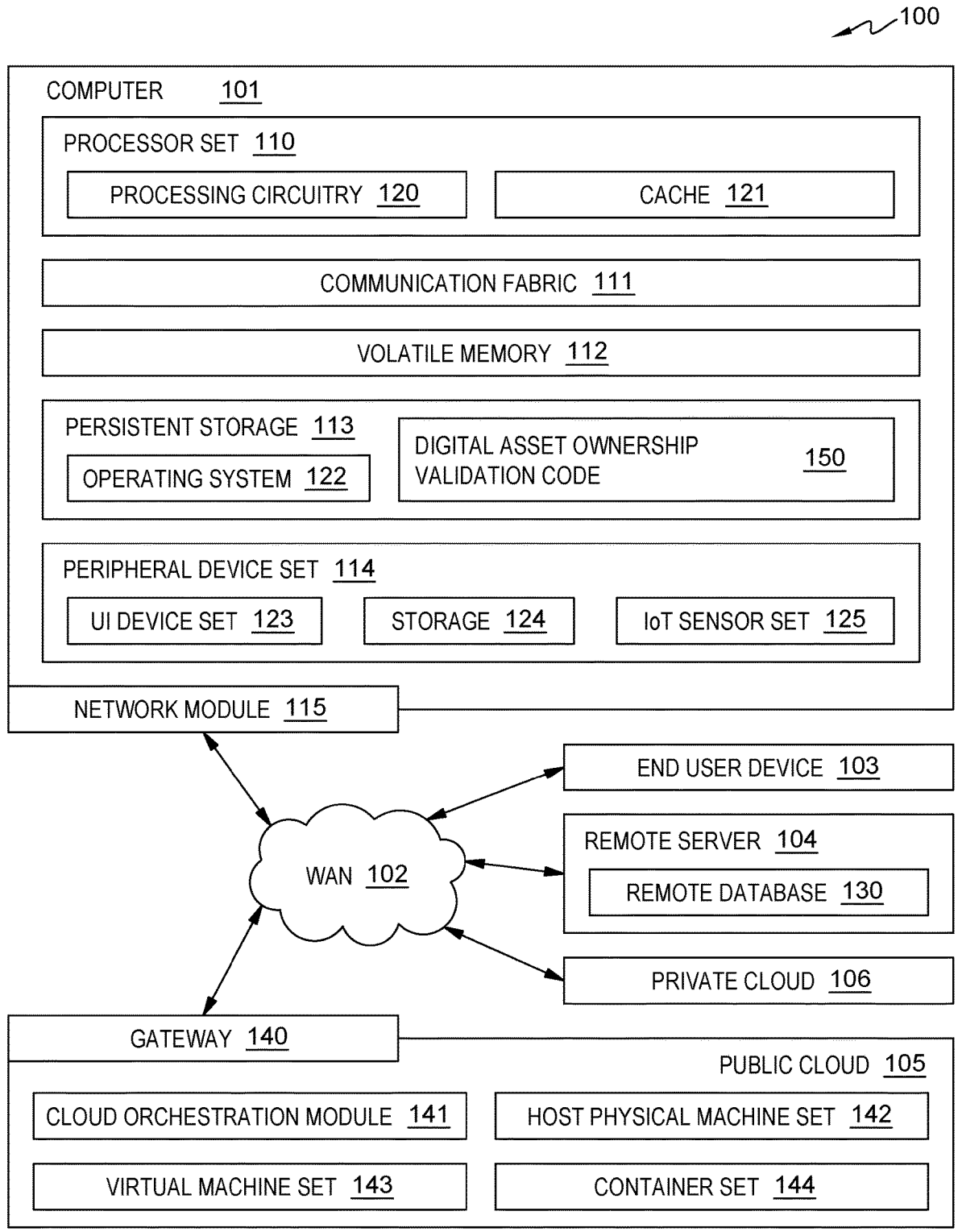
FIG. 1 is a functional block diagram of a computing environment, generally designated 100, suitable for the execution of at least some of the computer code involved in performing the inventive methods, such as digital asset ownership validation code 150, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of digital assets, and more particularly to, authenticating a digital asset and validating the ownership of a digital asset.

An NFT is a blockchain ledger entry/token that represents a unique physical or digital (non-fungible) asset. Current NFT minting processes reveal digital assets directly by posting the asset on a blockchain ledger or indirectly by posting a location of an asset on the ledger entry with access information along with a hash of the asset. Digital asset verification is performed by comparing hashes stored in NFT with a hash of the original asset.

Proof of ownership is a challenge from another client to current owner for validating that the owner has access to the original digital asset. NFTs function like certificates of ownership with a means for validation via a smart contract, pointers to the asset, and other information. Just like other certificates, this does not prevent fraud or theft because the solution is one sided. Assets can only be validated against the blockchain instance where it is stored, which does not prevent the assets from being stolen and the subsequent minting of new NFTs on another blockchain instance. This is especially true for digital assets, which are too large to be encoded as part of NFTs. Without the ability of referencing NFT information from the asset, it is impossible to prove asset ownership, which in turn will not reduce fraud. Current solutions include services for validating NFTs or checking if NFTs exist in a blockchain instance, adding social network vectors to NFTs, or scanning public sources for similar art. When a NFT is minted, a token id on the blockchain is returned. The NFT contains a reference to the original work and may contain the associated information required for accessing the original work or token to the original work when stored in a ledger. Embodiments of the present invention include a solution for proving ownership of the original asset without exposing ownership credentials or original assets.

Current NFT minting processes allow for local asset validation by a client and ledger registry for tracking ownership without proof. Asset validation is performed by performing a hash of the asset and comparing the result to the hash stored in the NFT. This requires the asset to be world viewable, which enables any bad actor to download the asset, mint a new NFT claiming ownership, and posting it to a ledger. Embodiments of the present invention augment the NFT minting process by using a live hash instead of a regular hash.

Embodiments of the present invention use encrypted digital assets when minting NFTs and enable ownership validation to ensure that any potential buyer of an NFT can trust that the current owner of the NFT is legitimate. Since the digital asset is encrypted, image validation is performed by a smart contract. Smart contracts are executed on nodes within a Trusted Execution Environment (TEE) to ensure the unencrypted asset is never revealed, which ultimately results in a validation process that is trusted by all parties. The same validation smart contract is then used for proving ownership of digital asset.

Embodiments of the present invention generate a nonce. A nonce is an arbitrary number that can be used just once in a cryptographic communication. A nonce is often a random or pseudo-random number used in an authentication protocol to ensure that old communications cannot be used fraudulently. Embodiments of the present invention, require a requester to supply a nonce and the owner repository performs a liveness hash in order to prove ownership. Embodiments of the present invention improve upon current methods by using a derivative hash instead of a raw hash, making it more difficult for fraudulent copying.

Embodiments of the present invention improve upon existing NFT minting processes by using a liveness hash instead of a regular hash. Embodiments of the present invention prevent NFT fraud and theft by never revealing the original digital asset to potential bad actors, securing all operations by referencing an encrypted instance of original asset, preventing validation fraud by using Liveness hash, using smart contracts for the minting and validation process, and utilizing a secure environment for executing a smart contract. Embodiments of the present invention perform registry operations in the ledger, thereby preventing single point of failure and enhanced security provided by blockchain environment.

Embodiments of the present invention perform verification by comparing the liveness hash provided by the owner of the digital asset with a liveness hash created by smart contract. Liveness hash is comprised of hash of combined hash of decrypted digital image and nonce. Entity requesting verification provides a nonce that will be used in the liveness hash. Embodiments of the present invention use a nonce as a seed in the hashing algorithm. Providing the nonce ensures the liveness hash will have to be calculated. Further, preventing a cashed value from being used by the owner of the digital asset during verification.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram of a computing environment, generally designated 100, suitable for the execution of at least some of the computer code involved in performing the inventive methods, such as digital asset ownership validation code stored in block 150, in accordance with at least one embodiment of the present invention. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
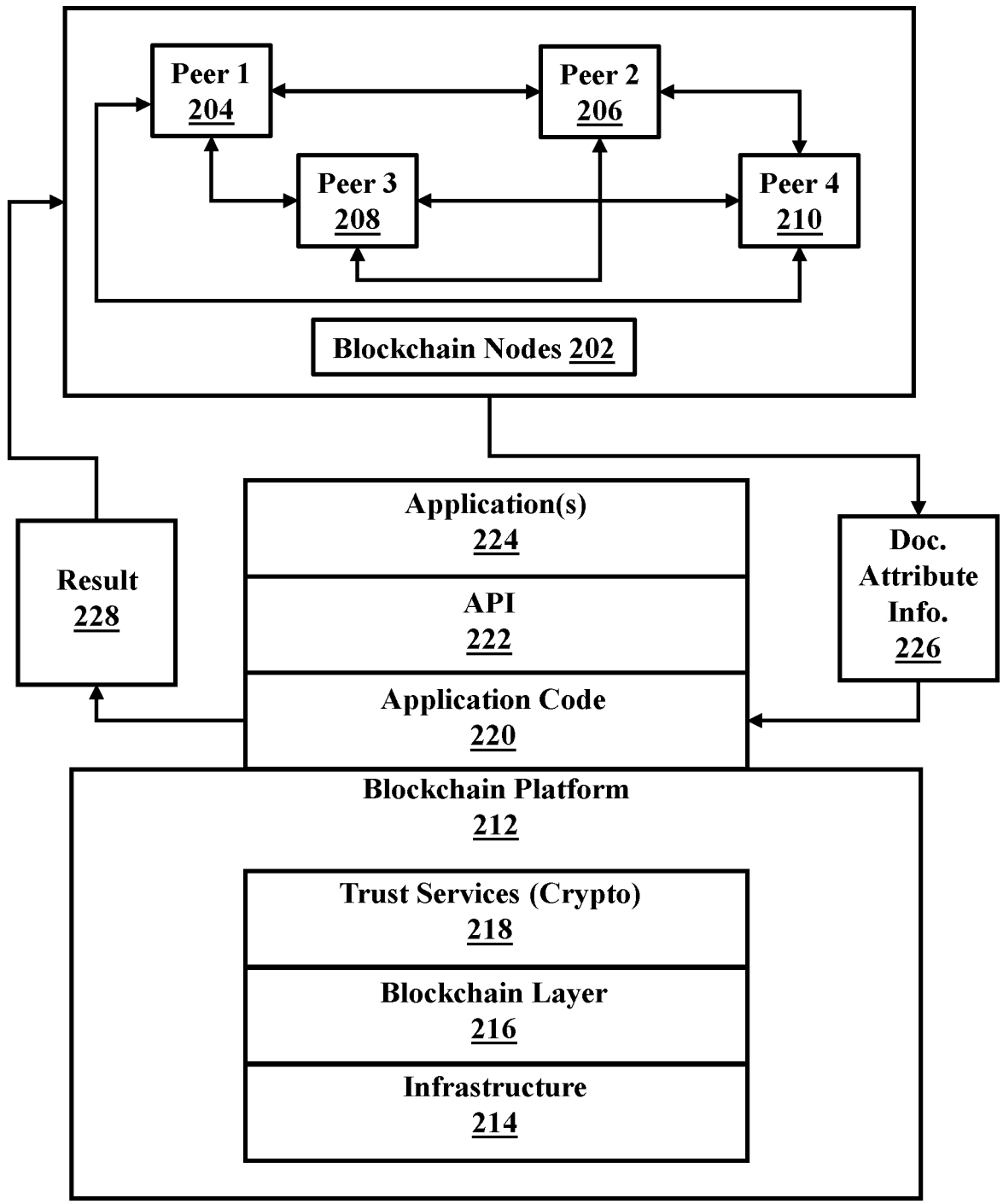
FIG. 2A illustrates an example blockchain architecture configuration, generally designated 200, according to at least one embodiment of the present invention.

FIG. 2A illustrates an example blockchain architecture configuration, according to at least one embodiment of the present invention. The blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute the generation of storage spaces, the reserving of storage spaces, updates to current transaction agreements, etc. The smart contracts can themselves be used to identify rules associated with authorization and access requirements and usage of the ledger. For example, the document attribute(s) information 226 may be processed by one or more processing entities (e.g., virtual machines) included in the blockchain layer 216. The result 228 may include a plurality of linked shared documents (e.g., with each linked shared document recording the issuance of a smart contract, etc.). The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus establishing a new smart contract between a user and a licensor).

Figure 2B:
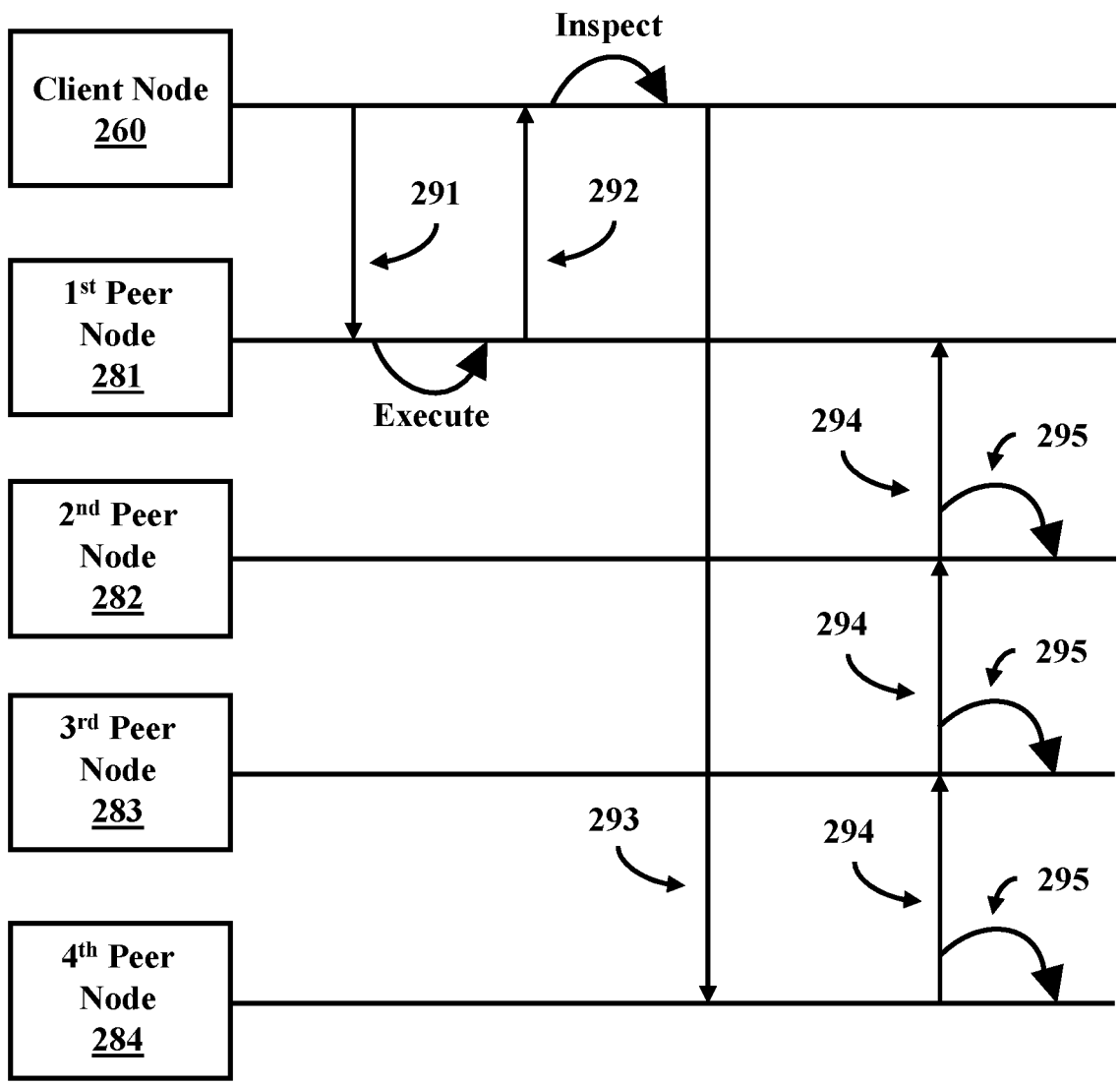
FIG. 2B illustrates a blockchain transactional flow, generally designated 250, in accordance with at least one embodiment of the present invention.

FIG. 2B illustrates an example of a blockchain transactional flow 250 between nodes of the blockchain according to at least one embodiment of the present invention. Referring to FIG. 2B, the transaction flow may include a transaction proposal 291 sent by an application client node 260 to an endorsing peer node 281 (e.g., in some embodiments, the transaction proposal 291 may be sent for determining ownership, or authentication of a digital asset). The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the transaction terms, ownership, or other digital asset data to ensure correct allotment and distribution of assets for transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (e.g., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (e.g., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
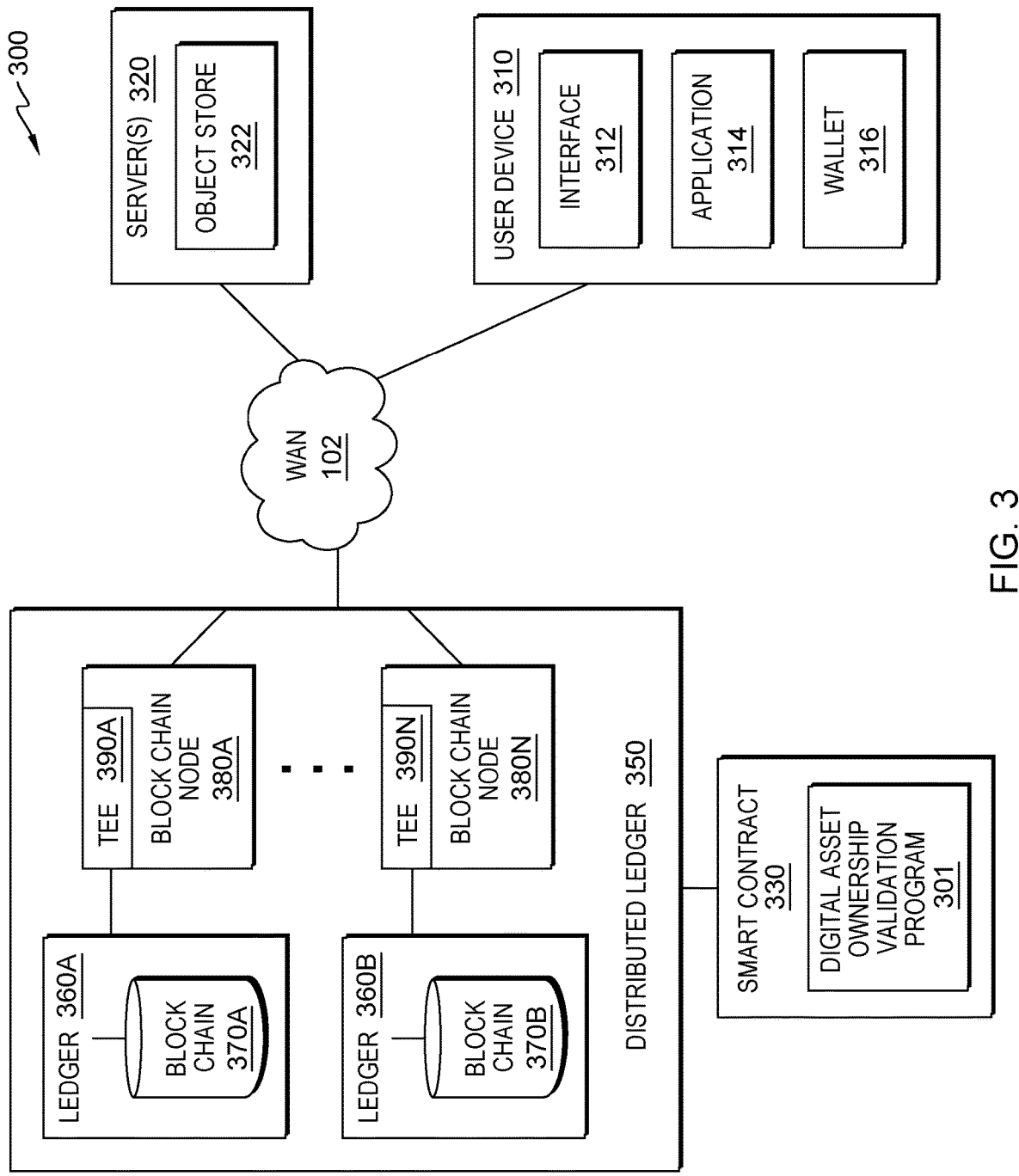
FIG. 3 is a functional block diagram of a digital asset ownership validation system, generally designated 300, suitable for operation of a digital asset transaction program 301, in accordance with at least one embodiment of the present invention.

FIG. 3 is a functional block diagram of a digital asset ownership validation system, generally designated 300, suitable for operation of a digital asset transaction program 301, in accordance with at least one embodiment of the present invention. Digital asset ownership validation system 300 may be implemented in a computing environment, such as computing environment 100, as described with reference to FIG. 1. FIG. 3 provides an illustration of only one implementation and does not imply any limitations with regard to the environments in which different embodiments may be implemented. Many modifications to the depicted environment may be made by those skilled in the art without departing from the scope of the present invention as recited by the claims.

Digital asset ownership validation system 300 includes user device 310, server 320, smart contract 330, distrusted ledger 350, ledger 360A and 360B, blockchain 370A and 370B, blockchain nodes 380A-380N, and TEE 390A-390N interconnected over network, such as WAN 102. In general, user device 310 can represent any programmable electronic device or combination of programmable electronic devices capable of executing machine readable program instructions and communicating with server 320 and other devices (not depicted) via a network, such as WAN 102. In an embodiment, user device 310 is an end user device, such as EUD 103 depicted in FIG. 1, and can be a mobile device, laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art.

User device 310 further includes user interface 312, application 314, and wallet 316. User interface 312 is a program that provides an interface between a user of an end user device, such as user device 310, and a plurality of applications that reside on the device (e.g., application 314). A user interface, such as user interface 312, refers to the information (such as graphic, text, and sound) that a program presents to a user, and the control sequences the user employs to control the program. A variety of types of user interfaces exist. In one embodiment, user interface 312 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 312 is a script or application programming interface (API).

Application 314 can be representative of one or more applications (e.g., an application suite) that operate on user device 310. In an embodiment, application 314 is representative of one or more applications (e.g., asset holding applications, asset marketplace applications, and asset authentication applications) located on user device 310. For example, a user accesses an asset holding software via application 314 to buy a digital asset. In another example, a user uploads a digital asset online via application 314. In various example embodiments, application 314 can be an application that a user of user device 310 utilizes to access an asset marketplace website and post for sale, trade, offer, or buy digital assets. In an embodiment, application 314 can be a client-side application associated with a server-side application running on server 320 (e.g., a client-side application associated with digital asset ownership validation program 301). In an embodiment, application 314 can operate to perform processing steps of digital asset ownership validation program 301 (i.e., application 314 can be representative of digital asset ownership validation program 301 operating on user device 310).

Wallet 316 is a digital or cryptocurrency wallet. In an embodiment, wallet 316 includes information associated with one or more public and private keys corresponding to a digital asset. In an embodiment, wallet 316 includes information on one or more digital assets. In an embodiment, a digital asset includes an NFT, cryptocurrency, funds, or other digital assets. In an embodiment, wallet 316 is a hardware cryptocurrency wallet.

Server 320 is configured to provide resources to various computing devices, such as user device 310. In general, server 320 represents any programmable electronic device or combination of programmable electronic devices capable of executing machine readable program instructions and communicating with each other, as well as with user device 310, smart contract 330, and other computing devices (not shown) within a network, such as WAN 102. In an embodiment, server 320 is a standalone device, such as computer 101 depicted in FIG. 1, that is capable of running a program and accessing a network or querying a database. In an embodiment, server 320 can be a management server, a web server, an application server, a mobile device, or any other electronic device or computing system capable of receiving, sending, and processing data. In an embodiment, server 320 represents a server computing system utilizing multiple computers as a server system. In an embodiment, server 320 represents a computing system utilizing clustered computers and components (e.g., database server computer, application server computer, web server computer, webmail server computer, media server computer, etc.) that act as a single pool of seamless resources. Server 320 further includes object store 322. In an exemplary embodiment, server 320 further includes digital asset owner verification program 301.

In an embodiment, object store 322 stores information on digital assets. In an embodiment, object store 322 is an object store service running on one or more servers.

Smart contract 330 includes information on one or more smart contracts attached or associated with a digital asset. In an embodiment, smart contract 330 includes executable code which is registered, stored, and/or replicated with a blockchain. A transaction is an execution of the smart contract code which can be performed in response to conditions associated with the smart contract being satisfied, such as transferring an NFT from one cryptocurrency wallet to another. In an embodiment, digital asset owner verification program 301 accesses a smart contract, such as smart contract 330, associated with the digital asset to verify that the first liveness hash matches the hash of the digital asset and the first nonce.

In an embodiment, smart contract 330 includes digital asset ownership validation program 301. In an embodiment, digital asset ownership validation program 301 is a registry and is a subset of smart contract 330. Digital asset ownership validation program 301 may be formed, at least in part, from digital asset ownership validation code 150 as depicted and described with reference to FIG. 1. In an embodiment, digital asset ownership validation program 301 is separate from smart contract 330. For example, in some embodiments, digital asset ownership validation program 301 is included in server 320. In an embodiment, smart contract 330 and a smart registry can be used interchangeably.

In an embodiment, digital asset owner verification program 301 may be configured to access various data sources, such as the users digital wallet that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, digital asset owner verification program 301 enables the authorized and secure processing of personal data. In an embodiment, digital asset owner verification program 301 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, digital asset owner verification program 301 provides information regarding personal data and the nature (e.g., type, scope, purpose, duration, etc.) of the processing. In an embodiment, digital asset owner verification program 301 provides a user with copies of stored personal data. In an embodiment, digital asset owner verification program 301 allows for the correction or completion of incorrect or incomplete personal data. In an embodiment, digital asset owner verification program 301 allows for the immediate deletion of personal data.

In an embodiment, smart contract 330 is written to the blockchain in the form of key-value pairs. Furthermore, the smart contract code can be structured to read the values stored in a blockchain and use them in application operations. The smart contract code can be structured to write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

In an embodiment, smart contract 330 is executed on nodes with TEE 390A-390N. In an embodiment, smart contract 330 receives encrypted digital asset, nonce, and liveness hash. In an embodiment, the liveness hash is a derived hash from the raw hash. In an embodiment, smart contract 330 determines the private key associated with the digital asset or wallet. In an embodiment, smart contract 330 performs TEE actions and returns the results to TEE 390A-390N.

In an embodiment, smart contract 330 is executed in TEE 390A-390N on blockchain nodes 380A-380N. In an embodiment, smart contract 330 receives an encrypted digital asset, nonce, private key, and liveness hash. In an embodiment, a nonce is a randomly generated number only used once. In an embodiment, smart contract 330 decrypts digital asset (A), computes a liveness hash H', such as sha256(sha256(A)∥nonce), and returns verify H==H'.

In an embodiment, digital asset ownership validation program 301 is a smart contract, such as smart contract 330. In these embodiments, digital asset ownership validation program 301 runs within a blockchain peer. In an embodiment, server 320 is a smart contract, such as smart contract 330. In these embodiments, a key-value storage or object storage is configured to run inside each smart contract 330. In an embodiment, the key-value storage or object store is an object stored within a blockchain peer or a decentralized object storage system accessible to blockchain peers as oracles. Blockchain oracles are entities that connect blockchain to external systems thereby enabling smart contracts to execute based upon inputs and outputs.

Distributed ledger 350 comprises one or more independent computers or nodes, such as ledger 360A and 360B and blockchain nodes 380A-380N, used to share and synchronize transactions in their respective electronic ledgers. In an embodiment, distributed ledger 350 is stored in a local blockchain, such as blockchain 370A or 370B.

Ledger 360A and 360B include one or more ledgers capable of executing a blockchain, such as blockchain 370A and 370B.

Blockchain 370A and 370B may be configured to use one or more smart contracts, such as smart contract 330, that manage transactions for multiple participating nodes. In some embodiments, a neural network and/or any form of machine-learning may be utilized by the cloud service providers to analyze the smart contracts and/or transaction requests to determine transaction terms or authenticating information. In an embodiment, blockchain 370A and 370B may store data to be shared among the nodes, such as blockchain nodes 380. In an embodiment, blockchain 370A and 370B may be represented by blockchain architecture configuration 200, as described with reference to FIG. 2A.

Blockchain nodes 380A-380N includes one or more nodes. In an embodiment, blockchain nodes 380A-380N may be represented by blockchain nodes 202, as previously described with reference to FIG. 2A.

TEE 390A-390N are trusted execution environments and secure areas of blockchain nodes 380A-380N. In an embodiment, TEE 390A-390N protects code and data confidentiality. In an embodiment, smart contract 330 is executed by TEE 390A-390N in blockchain nodes 380A-380N.

In an embodiment, digital asset ownership validation program 301 receives a digital asset and generates a nonce for the digital asset. In an embodiment, the digital asset is an image or other multimedia and digital asset ownership validation program 301 receives a nonce in a request to validate a digital asset. In an embodiment, a nonce is a randomly generated number only used once. In an embodiment, digital asset ownership validation program 301 adds the nonce to a hash of encrypted image or digital asset. In an embodiment, the image encryption is the process of encoding an image with an encryption algorithm in such a way that unauthorized users can't access it. In an embodiment, digital asset ownership validation program 301 generates a liveness hash based on the image and nonce, such as liveness hash=sha256(sha256(image)∥nonce). In an embodiment, the liveness hash includes the nonce which is a challenge sent by a user and the returned hash of image hash and nonce is the response token to the challenge.

In an embodiment, digital asset ownership validation program 301 receives an encryption public key (PubKey). In an embodiment, the public key is the public key paired to a private key. In an embodiment, digital asset ownership validation program 301 encrypts the image and public key based on the nonce and liveness hash, such as Encrypt (image, PubKey), nonce, Liveness Hash.

In an embodiment, digital asset ownership validation program 301 decrypts an encrypted image and private key, such as image=decrypt(enc image, PrivKey). In an embodiment, digital asset ownership validation program 301 accesses the smart contract to verify that the liveness hash matches the hash of the image and nonce, such as verify: liveness hash==sha256(sha256(image)∥nonce). In an embodiment, digital asset ownership validation program 301 stores the encrypted image record including the liveness hash initial and the encrypted image on the blockchain, such as store image record: <liveness hash initial, image>.

In an embodiment, digital asset ownership validation program 301 receives a request to authenticate ownership of a digital asset. In an embodiment, digital asset ownership validation program 301 decrypts a received image id with a private key, such as image=decrypt(get(image id), PrivKey). In an embodiment, digital asset ownership validation program 301 verifies the second liveness hash matches the hash of the image and the nonce, such as verify: liveness hash 2==sha256(sha256(image)||nonce2). In an embodiment, digital asset ownership validation program 301 validates ownership if the second liveness hash matches the liveness hash of the image and the nonce.

In an embodiment, digital asset ownership validation program 301 receives a request from one user to validate a digital asset currently owned by another user. In an embodiment, digital asset validation program 301 receives a liveness hash of hash original asset and nonce from the digital asset owner. In an embodiment, digital asset validation program 301 receives a liveness hash, nonce, and reference to encrypted image (image id) from the digital asset owner. In an embodiment, digital asset ownership validation program 301 generates an encrypted instance of an original asset and a liveness hash. In an embodiment, digital asset ownership validation program 301 posts on a blockchain ledger the encrypted instance of the original asset and referencing the liveness hash of the original asset. In an embodiment, digital asset ownership validation program 301 determines a consensus of the liveness hash using a smart contract, such as smart contract 330 executed in a trusted execution environment, such as TEE 390A-390N, in the blockchain ledger.

In an embodiment, proof of ownership is requested from one user to the owner directly or the request is forwarded to the owner and digital asset validation program 301. In another embodiment, digital asset ownership validation program 301 receives a verification request for a digital asset from a user and sends the request to a registry (NFT, Liveness Hash (H), Nonce (N). In an embodiment, digital asset ownership validation program 301 determines or receives the smart contract for the digital asset. In an embodiment, digital asset ownership validation program 301 receives or determines an encrypted digital asset (Ae). In an embodiment, digital asset ownership validation program 301 validates Hash (Ae, H, N). In an embodiment, digital asset ownership validation program 301 determines or receives the registry private key (RPk). In an embodiment, digital asset ownership validation program 301 validates the hash (Ae, H, N, RPk). In an embodiment, digital asset ownership validation program 301 decrypts the digital asset. In an embodiment, digital asset ownership validation program 301 computes the liveness hash for the digital asset (H'). In an embodiment, digital asset ownership validation program 301 performs verification, based at least in part on, the first liveness hash H matching the second liveness hash H' (H==H'). In an embodiment, digital asset ownership validation program 301 sends verification of ownership to the user. In an embodiment, digital asset ownership validation program 301 transmits information of authentic ownership from a smart contract TEE to a smart contract. In an embodiment, digital asset ownership validation program 301 transmits information of authentic ownership from a smart contract to the registry.

In an example, digital asset ownership validation program 301 authenticates a digital asset with a ledger using a public and private key authentication. Digital asset ownership validation program 301 requests a registry public key (Rpk). Digital asset ownership validation program 301 generates a public and private key par and registers the key pair. Digital asset ownership validation program 301 generates an nonce (Nr). Digital asset ownership validation program 301 generates a hash of the digital asset (Ah), for example sha256 (As set). Digital asset ownership validation program 301 generates a liveness hash (LHr) by determining the nonce (Nr) and liveness hash (Ah), for example sha256(Ah|Nr). Digital asset ownership validation program 301 encrypts Asset using registry public key (Aenc)=encrypt(Rpk)(Asset). Digital asset ownership validation program 301 transmits the encrypted asset to the registry store, such as object store 322 as depicted in FIG. 3, with a unique key composed of the liveness hash and nonce (LHr:Nr). For example, registry could use object store or other key/value store where address is LHr:Nr and the value is the encrypted asset. Digital asset ownership validation program 301 receives a request to mint an NFT digital asset to a registry with input including the public owner, owner public key, store key (Sk)=LH:Nr, store URL, liveness hash (LHr) and nonce (Nr).

In another example, digital asset ownership validation program 301 determines the validation nonce (Nv) for the digital asset. Digital asset ownership validation program 301 sends the validation request to Owner of the digital asset with the validation nonce (Nv) and digital asset address. Owner processes the request and digital asset ownership validation program 301 receives a response. Digital asset ownership validation program 301 retrieves digital access and calculates a liveness hash using validation nonce (Nv) based at least in part on the asset hash (Ah)=sha256(image) and liveness hash (H)=sha256(Ah|Nv). Digital asset ownership validation program 301 sends reply to User with a new liveness hash (H). User sends the received liveness hash (H) with the validation nonce (Nv) and digital asset reference to the registry for validation. Registry receives ownership validate request, wherein the input request comprises the digital asset reference, H, from User, and nonce (Nv). Registry retrieves encrypted asset from address (URL) and smart contract reference from digital asset. Registry calls the smart contract with input of Owner liveness hash (H), encrypted asset, and nonce (Nv). Digital asset ownership validation program 301 sends consensus results from the smart contract to User.

In an example, an owner requests public key for encrypting image from smart contract 330. Here, public key retuned by smart contract (public/private key pair stored in blockchain environment). Owner creates nonce, calculates liveness hash of original image and nonce, encrypts original image with public key, and sends encrypted image, nonce, and liveness hash to registration smart contract. Here, for digital asset ownership validation program 301 receives the encrypted image, nonce, and liveness hash to registration smart contract from the owner. Digital asset ownership validation program 301 performs verification of liveness hash. Digital asset ownership validation program 301 stores encrypted image to storage service or repository using initial liveness hash as key. Digital asset ownership validation program 301 creates NFT that includes storage service address and key to encrypted image (initial liveness hash). Digital asset ownership validation program 301 stores the encrypted image in storage service that is external to blockchain environment, such as Cloud Object Store (COS).

In another example, digital asset ownership validation program 301 receives an image or NFT, generated nonce, calculated liveness hash from a user. In an embodiment, the liveness hash is used in the creation of the NFT in place of stand hash in NFT minting process inputs. Inputs can include storage address, owner tokens, or liveness hash.

In an embodiment, digital asset ownership validation program 301 performs a registration process. In an embodiment, responsive to receiving a request from a first user for a public key, digital asset ownership validation program 301 transmits a public key to the first user. In an embodiment, digital asset ownership validation program 301 generates a public/private key pair and sends the public key to the first user. In an embodiment, digital asset ownership validation program 301 receives an encrypted image, nonce, and liveness hash from user A. In an embodiment, digital asset ownership validation program 301 decrypts the image and calculates a liveness hash of the image with the nonce received from user A. In an embodiment, if digital asset ownership validation program 301 determines the liveness hash received by user A matches the liveness hash calculated, digital asset ownership validation program 301 stores the image. In an embodiment, the original liveness hash is used as a key for the encrypted image in storage system.

In an embodiment, digital asset ownership validation program 301 performs an ownership validation process. In an example, a second user transmits proof of request of ownership with a nonce to a first user. In an example, the first user determines a liveness hash with the nonces received from the second user. In an embodiment, digital asset ownership validation program 301 transmits the determined liveness hash with the nonce received from the second user to the second user. In an embodiment, digital asset ownership validation program 301 receives a validation request from the second user including the nonce, image id, and returned liveness hash. In an embodiment, digital asset ownership validation program 301 decrypts the image and determines the liveness hash using the received nonce. In an embodiment, digital asset ownership validation program 301 determines ownership is valid if both liveness hashes match. In an embodiment, digital asset ownership validation program 301 determines ownership is valid if the liveness hashes do not match.

Figure 4:
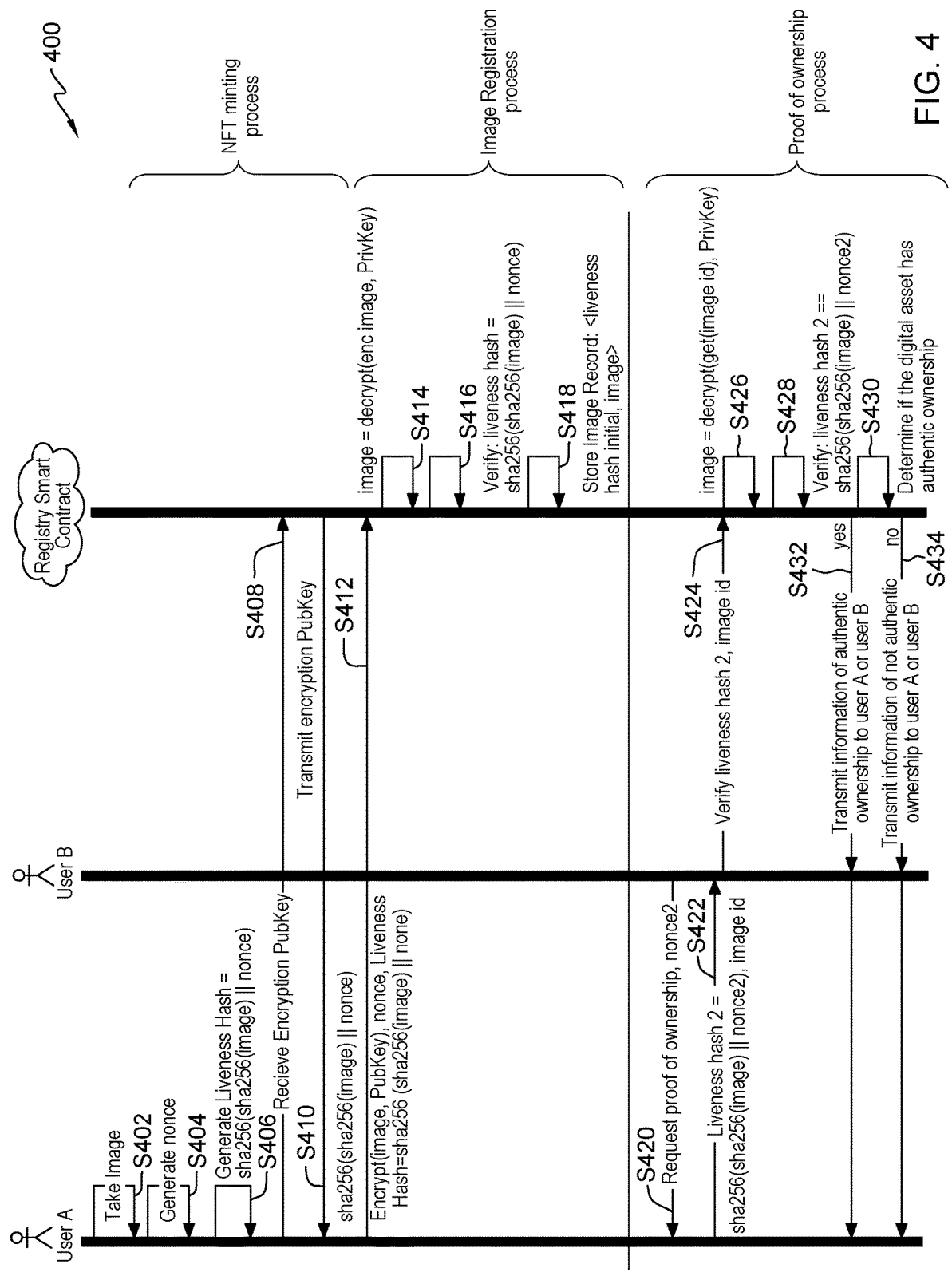
FIG. 4 is a flow chart diagram depicting operational steps for digital asset ownership validation program 301, generally designated 400, in accordance with at least one embodiment of the present invention.

FIG. 4 is a flow chart diagram depicting operational steps for digital asset ownership validation program 301, generally designated 400, in accordance with at least one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

At step S402, user A takes an image. In an embodiment, the image is a digital asset. In an embodiment, user A receives an image.

At step S404, user A generates a nonce. In an embodiment, a nonce is a randomly generated number.

At step S406, user A generates a first liveness hash. In an embodiment, user A generates a liveness hash based on the image and nonce, such as liveness hash=sha256(sha256(image)||nonce).

At step S408, digital asset ownership validation program 301 receives an encryption public key (PubKey). In an embodiment, digital asset ownership validation program 301 generates an encryption public key responsive to receiving a request from user A for a public key for encrypting the digital asset. In an embodiment, the public key is paired with a private key for a user's cryptocurrency wallet. In an embodiment, digital asset ownership validation program 301 receives the encryption public key from user A and transmits the determined encryption public key to registry smart contract.

At step S410, digital asset ownership validation program 301 transmits the encryption public key for an image. In an embodiment, digital asset ownership validation program 301 transmits a public key from the registry smart contract to user A.

At step S412, digital asset ownership validation program 301 encrypts the digital asset image and public key with the nonce and first liveness hash. In an embodiment, digital asset ownership validation program 301 encrypts the digital asset with the public key. In an embodiment, digital asset ownership validation program 301 determines the liveness hash with the image hash and nonce. In an embodiment, digital asset ownership validation program 301 receives a registration request with encrypted image, nonce, and liveness hash.

At step S414, digital asset ownership validation program 301 decrypts the encrypted digital asset image and private key.

At step S416, digital asset ownership validation program 301 verifies the first liveness hash=sha256(sha256(image)||nonce).

At step S418, digital asset ownership validation program 301 stores image record: <liveness hash initial, image>.

At step S420, digital asset ownership validation program 301 receives a request for proof of ownership, nonce2. In an embodiment, digital asset ownership validation program 301 receives a request for proof of ownership from user B.

At step S422, digital asset ownership validation program 301 determines liveness hash2=sha256(sha256(image)||nonce2), image id. In an embodiment, digital asset ownership validation program 301 transmits determined liveness hash hash2=sha256(sha256(image)||nonce2), image id from user A to user B.

At step S424, digital asset ownership validation program 301 verifies liveness hash 2, image id. In an embodiment, digital asset ownership validation program 301 transmits verified liveness hash 2, image id from user B to the registry smart contract.

At step S426, digital asset ownership validation program 301 determines image=decrypt(get(image id), PrivKey). In an embodiment, digital asset ownership validation program 301 decrypts the digital asset and the private key.

At step S428, digital asset ownership validation program 301 verifies liveness hash 2==sha256(sha256(image)||nonce2). In an embodiment, digital asset ownership validation program 301 determines that the first liveness hash matches the second liveness hash.

At decision step S430, digital asset ownership validation program 301 determines if the digital asset has authentic ownership. In an embodiment, digital asset ownership validation program 301 determines the digital asset has authentic ownership if the first liveness hash matches the second liveness hash. In an embodiment, digital asset ownership validation program 301 determines the digital asset does not have authentic ownership if the first liveness hash does not match the second liveness hash. If digital asset ownership validation program 301 determines the digital asset has authentic ownership (decision step S430 "YES" branch), digital asset ownership validation program 301 proceeds to step S432. If digital asset ownership validation program 301 determines the digital asset does not have authentic ownership (decision step S430 "NO" branch), digital asset ownership validation program 301 proceeds to step S434.

At step S432, digital asset ownership validation program 301 transmits information associated with the authentic ownership to user A or user B.

At step S434, digital asset ownership validation program 301 transmits information associated with the nonauthentic ownership to user A or user B.

Figure 5:
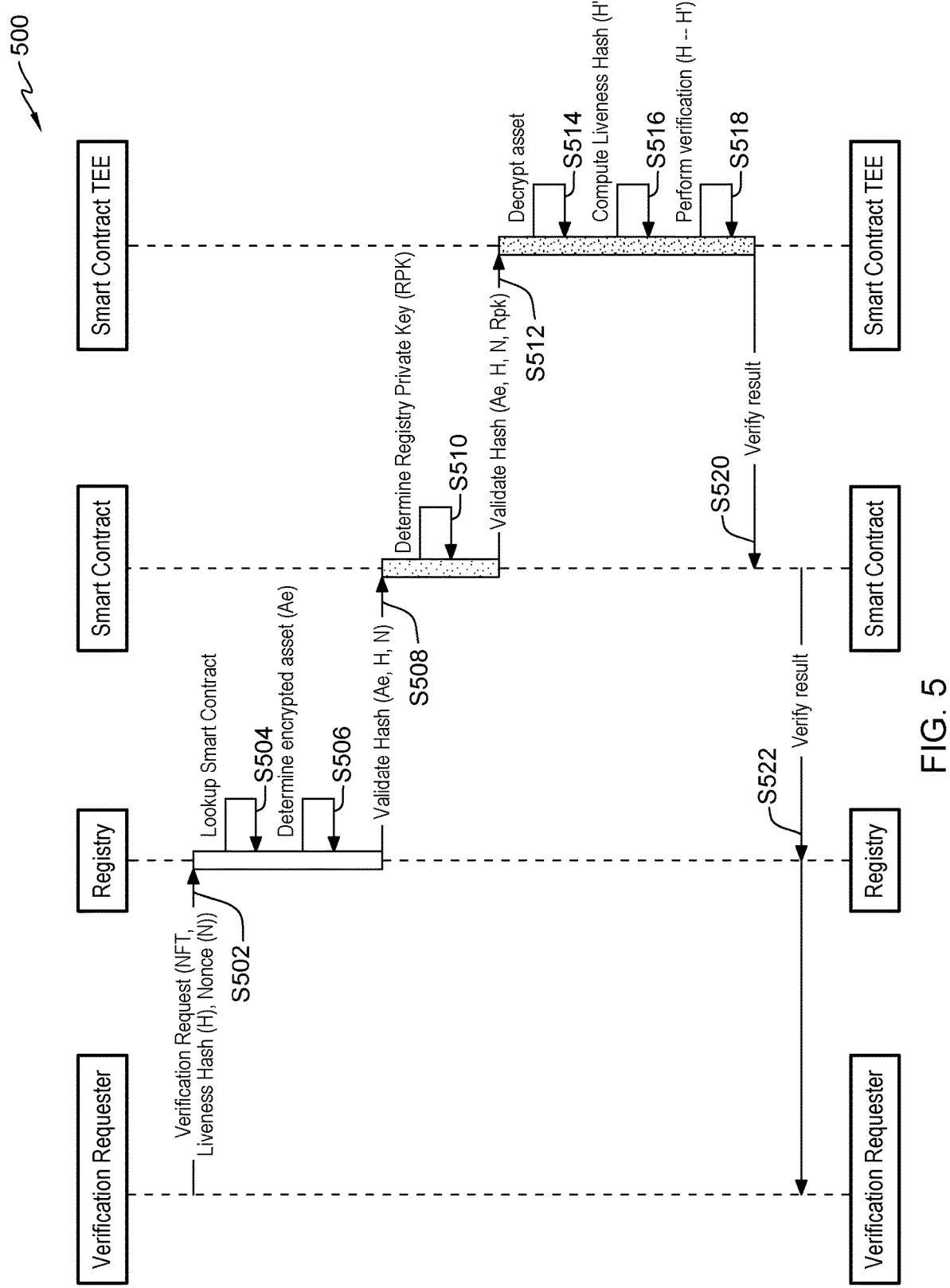
FIG. 5 is a flow chart diagram depicting operational steps for digital asset ownership validation program 301, generally designated 500, in accordance with at least one embodiment of the present invention.

FIG. 5 is a flow chart diagram depicting operational steps for digital asset ownership validation program 301, generally designated 500, in accordance with at least one embodiment of the present invention. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

At step S502, digital asset ownership validation program 301 receives a verification request for a digital asset (NFT, liveness hash (H), nonce (N)). In an embodiment, digital asset ownership validation program 301 receives a verification request for a digital asset from user A.

At step S504, digital asset ownership validation program 301 determines the smart contract.

At step S506, digital asset ownership validation program 301 determines the encrypted asset (Ae). In an embodiment, digital asset ownership validation program 301 receives the encrypted asset (Ae).

At step S508, digital asset ownership validation program 301 validates the hash (Ae, H, N).

At step S510, digital asset ownership validation program 301 determines the registry private key (RPK).

At step S512, digital asset ownership validation program 301 validates the hash (Ae, H, N, Rpk).

At step S514, digital asset ownership validation program 301 decrypts the asset.

At step S516, digital asset ownership validation program 301 computes the liveness hash (H').

At step S518, digital asset ownership validation program 301 performs verification (H==H'). In an embodiment, digital asset ownership validation program 301 determines hash (H) and liveness hash (H') are identical.

At step S520, digital asset ownership validation program 301 verifies the result. In an embodiment, digital asset ownership validation program 301 transmits the verified result from the smart contract TEE to the smart contract.

At step S522, digital asset ownership validation program 301 verifies result. In an embodiment, digital asset ownership validation program 301 transmits the verified result from the smart contract to the registry. In an embodiment, digital asset ownership validation program 301 transmits the verified result from the registry to the verification requester.

Figure 6:
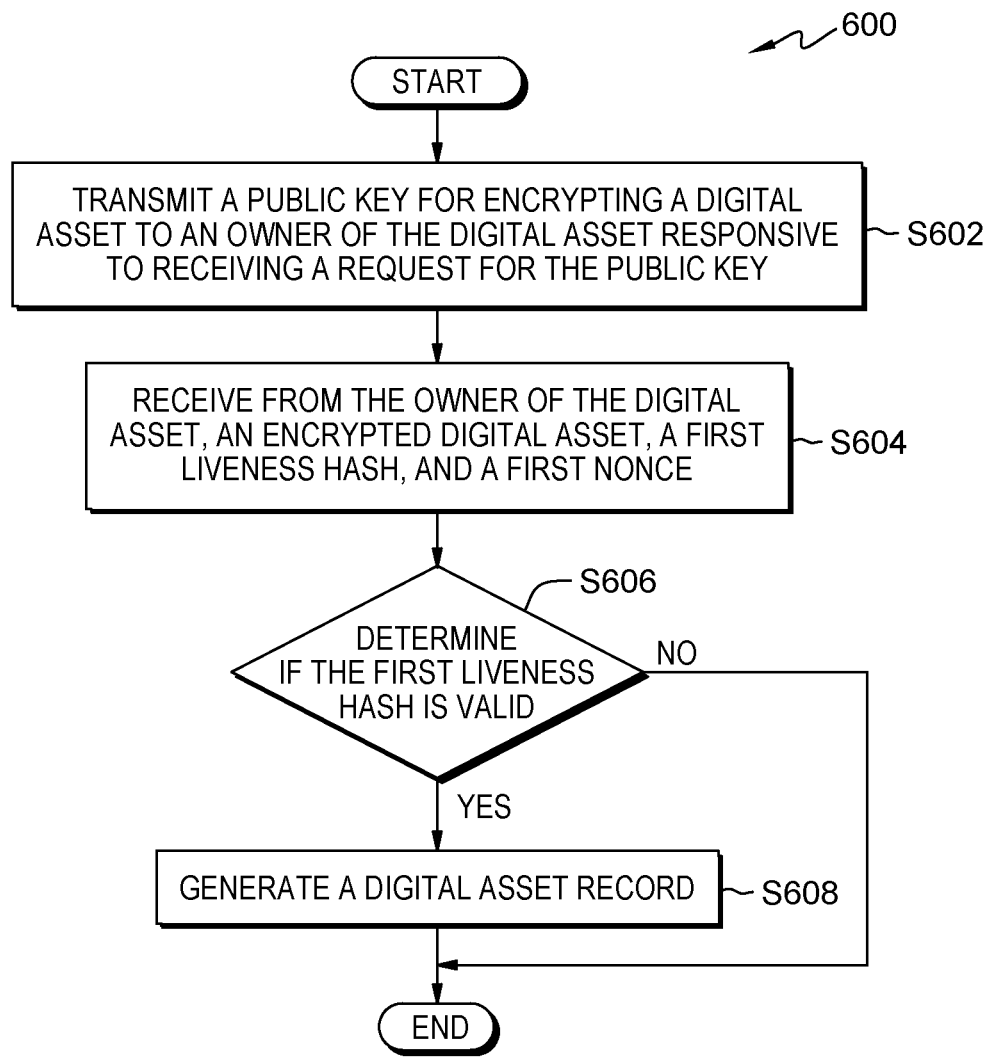
FIG. 6 is a flow chart diagram depicting operational steps for registering an image process, generally designated 600, in accordance with at least one embodiment of the present invention.

FIG. 6 is a flow chart diagram depicting operational steps for registering an image process, generally designated 600, in accordance with at least one embodiment of the present invention. FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

At step S602, digital asset ownership validation program 301 transmits a public key for encrypting a digital asset to an owner of the digital asset responsive to receiving a request for the public key. In an embodiment, transmitting a public key for encrypting a digital asset further comprises generating a public/private key pair. In an embodiment, the public key of the public/private key pair is used to encrypt the digital asset. In an embodiment, the private key of the public/private key pair is used to decrypt the encrypted digital asset.

At step S604, digital asset ownership validation program 301 receives from the owner of the digital asset, an encrypted digital asset, a first liveness hash, and a first nonce. In an embodiment, the digital asset is encrypted using the public key. In an embodiment, the first liveness hash is generated based, at least in part, on the digital asset in an unencrypted form and a first nonce.

At decision step S606, digital asset ownership validation program 301 determines if the first liveness hash is valid. In an embodiment, digital asset ownership validation program 301 transforms the encrypted digital asset back to an unencrypted digital asset using a private key associated with the digital asset. In an embodiment, digital asset ownership validation program 301 generates a second liveness hash based on the unencrypted digital asset and the first nonce. In an embodiment, digital asset ownership validation program 301 matches the first liveness hash to the second liveness hash. If digital asset ownership validation program 301 determines the first liveness hash is valid (decision step S606 "YES" branch), digital asset ownership validation program 301 proceeds to step S608. If digital asset ownership validation program 301 determines the first liveness hash is not valid (decision step S606 "NO" branch), digital asset ownership validation program 301 ends.

At step S608, digital asset ownership validation program 301 generates a digital asset record. In an embodiment, the digital asset record includes the encrypted digital asset and the first liveness hash. In an embodiment, digital asset ownership validation program 301 stores the digital asset record in at least one of a distributed ledger or storage service external to a blockchain environment.

Figure 7:
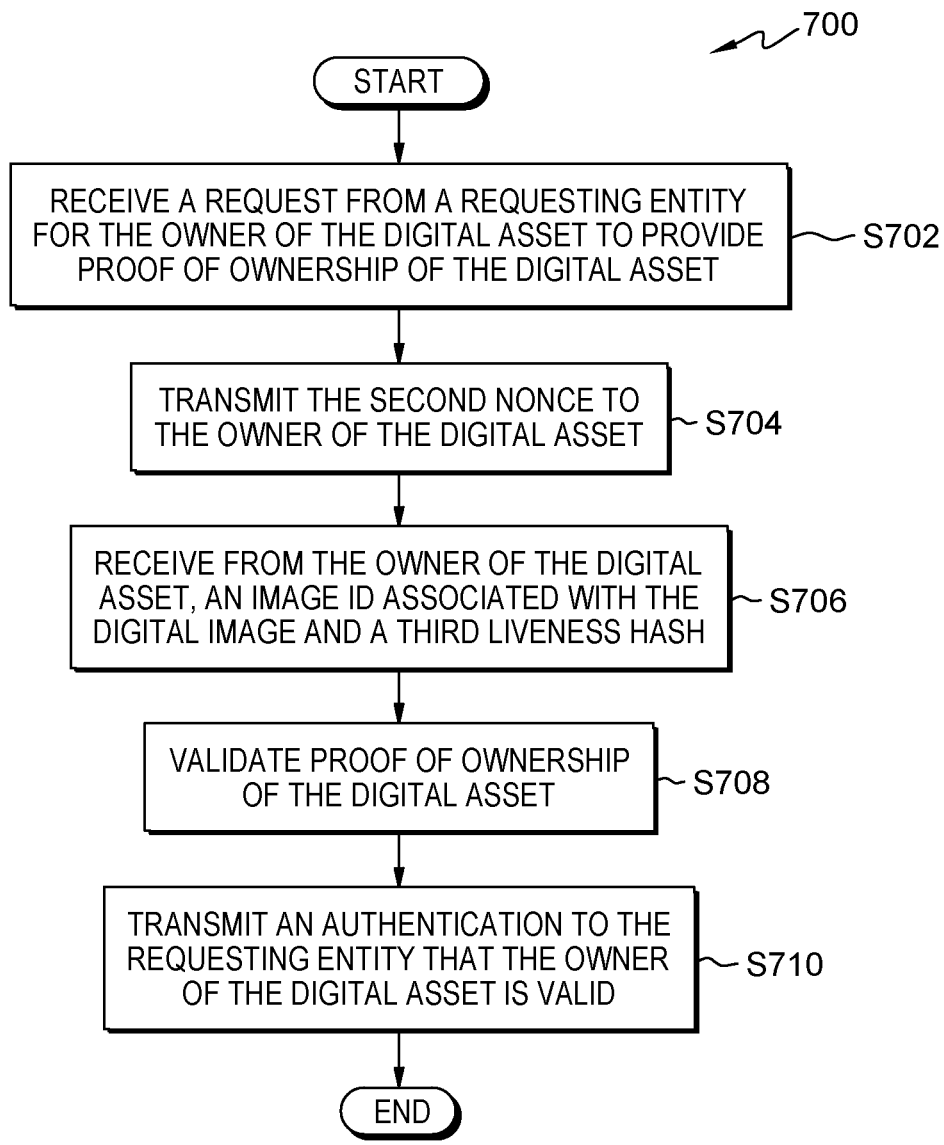
FIG. 7 is a flow chart diagram depicting operational steps for registering an image process, generally designated 700, in accordance with at least one embodiment of the present invention.

FIG. 7 is a flow chart diagram depicting operational steps for registering an image process, generally designated 700, in accordance with at least one embodiment of the present invention. FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

At step S702, digital asset ownership validation program 301 receives a request from a requesting entity for the owner of the digital asset to provide proof of ownership of the digital asset. In an embodiment, the request includes a second nonce.

At step S704, responsive to receiving the request for the owner of the digital asset to provide proof of ownership of the digital asset, digital asset ownership validation program 301 transmits the second nonce to the owner of the digital asset.

At step S706, digital asset ownership validation program 301 receives from the owner of the digital asset, an image id associated with the digital image and a third liveness hash. In an embodiment, the second liveness hash is generated based, at least in part, on the digital asset in an unencrypted form and the second nonce.

At step S708, digital asset ownership validation program 301 validates proof of ownership of the digital asset. In an embodiment, validating proof of ownership of the digital asset is based, at least in part on, retrieving, the encrypted digital asset from the digital asset record using the image id. In an embodiment, validating proof of ownership of the digital asset is based, at least in part on, transforming, the encrypted digital asset back to an unencrypted digital asset using the private key associated with the digital asset. In an embodiment, validating proof of ownership of the digital asset is based, at least in part on, generating a fourth liveness hash based on the unencrypted digital asset and the second nonce. In an embodiment, validating proof of ownership of the digital asset is based, at least in part on, matching the first liveness hash to the second liveness hash.

At step S710, responsive to validating the proof of ownership of the digital asset, digital asset ownership validation program 301 transmits an authentication to the requesting entity that the owner of the digital asset is valid.

Figure 8A:
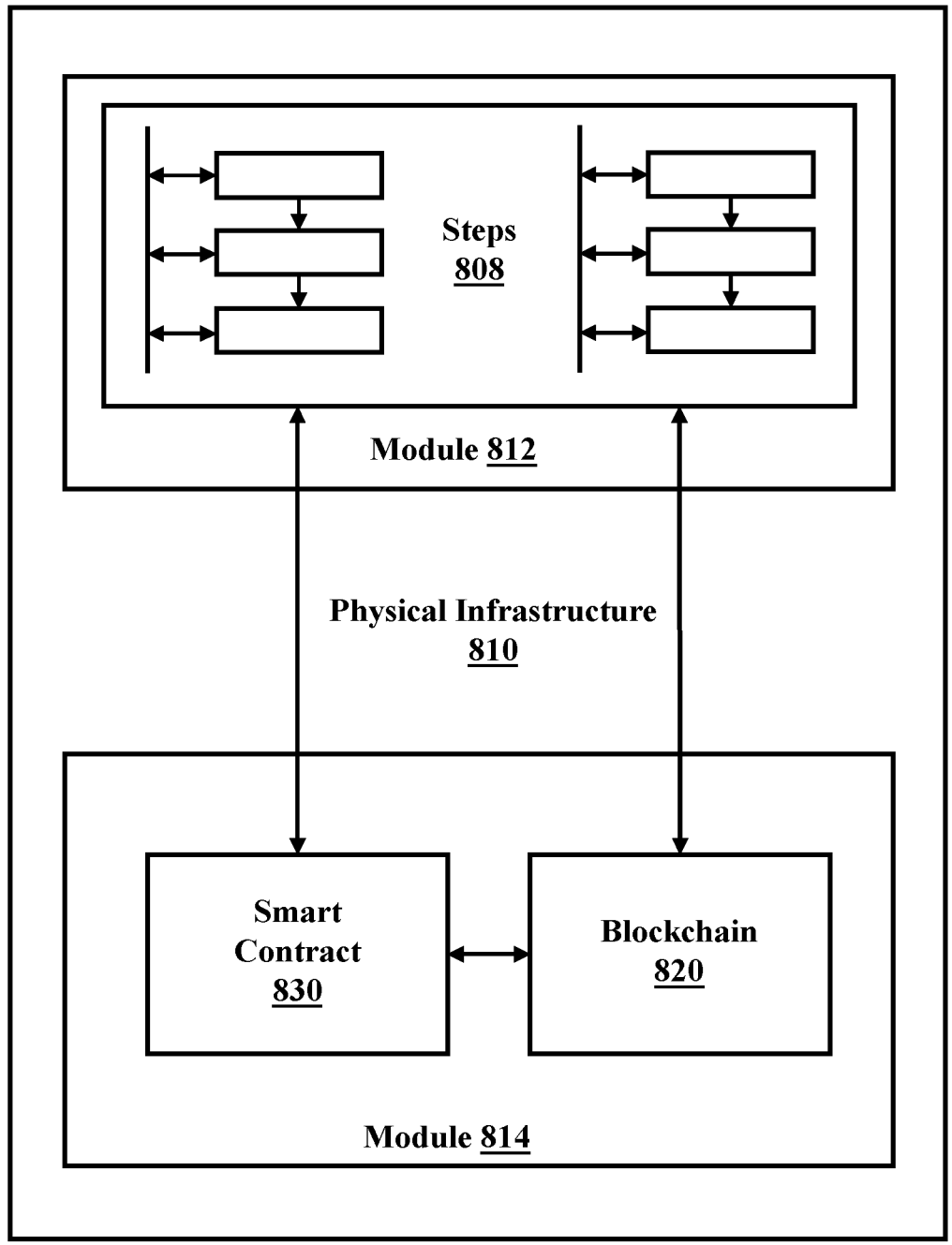
FIG. 8A illustrates an example system configured to perform one or more operations described herein, generally designated 800, in accordance with at least one embodiment of the present disclosure.

FIG. 8A illustrates an example system 800 that includes a physical infrastructure 810 configured to perform various operations in accordance with embodiments of the present disclosure. Referring to FIG. 8A, the physical infrastructure 810 includes a module 812 and a module 814. The module 814 includes a blockchain 820 and a smart contract 830 (which may reside on the blockchain 820), that may execute any of the operational steps 808 (in module 812) included in any of the example embodiments. The steps/operations 808 may include one or more of the embodiments described or depicted and may represent output or written information that is written or read from one or more smart contracts 830 and/or blockchains 820. The physical infrastructure 810, the module 812, and the module 814 may include one or more computers, servers, processors, memories, and/or wireless communication devices. Further, the module 812 and the module 814 may be a same module.

Figure 8B:
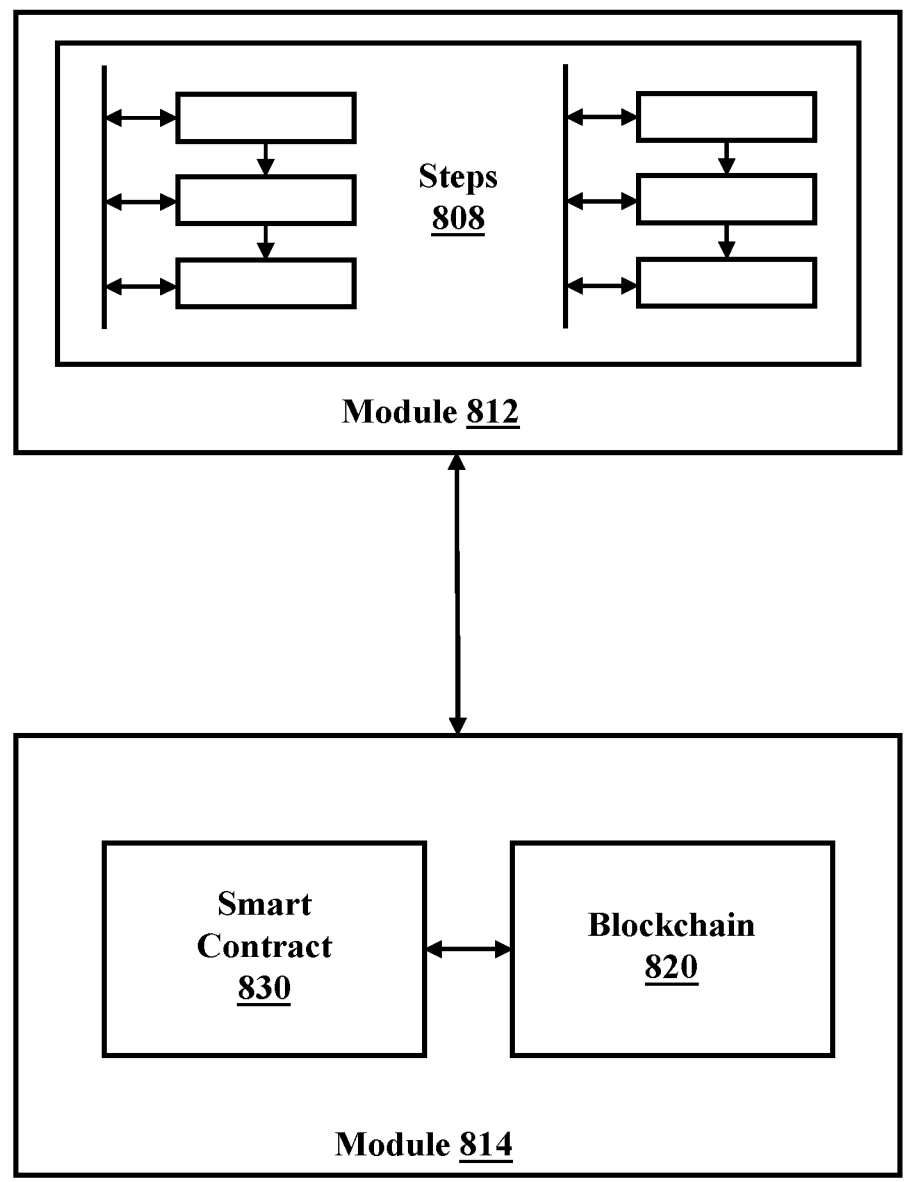
FIG. 8B illustrates another example system configured to perform one or more operations described herein, generally designated 840, in accordance with at least one embodiment of the present disclosure.

FIG. 8B illustrates another example system 840 configured to perform various operations in accordance with embodiments of the present disclosure. Referring to FIG. 8B, the system 840 includes a module 812 and a module 814. The module 814 includes a blockchain 820 and a smart contract 830 (which may reside on the blockchain 820), that may execute any of the operational steps 808 (in module 812) included in any of the example embodiments. The steps/operations 808 may include one or more of the embodiments described or depicted and may represent output or written information that is written or read from one or more smart contracts 830 and/or blockchains 820. The physical module 812 and the module 814 may include one or more computers, servers, processors, memories, and/or wireless communication devices. Further, the module 812 and the module 814 may be a same module.

Figure 8C:
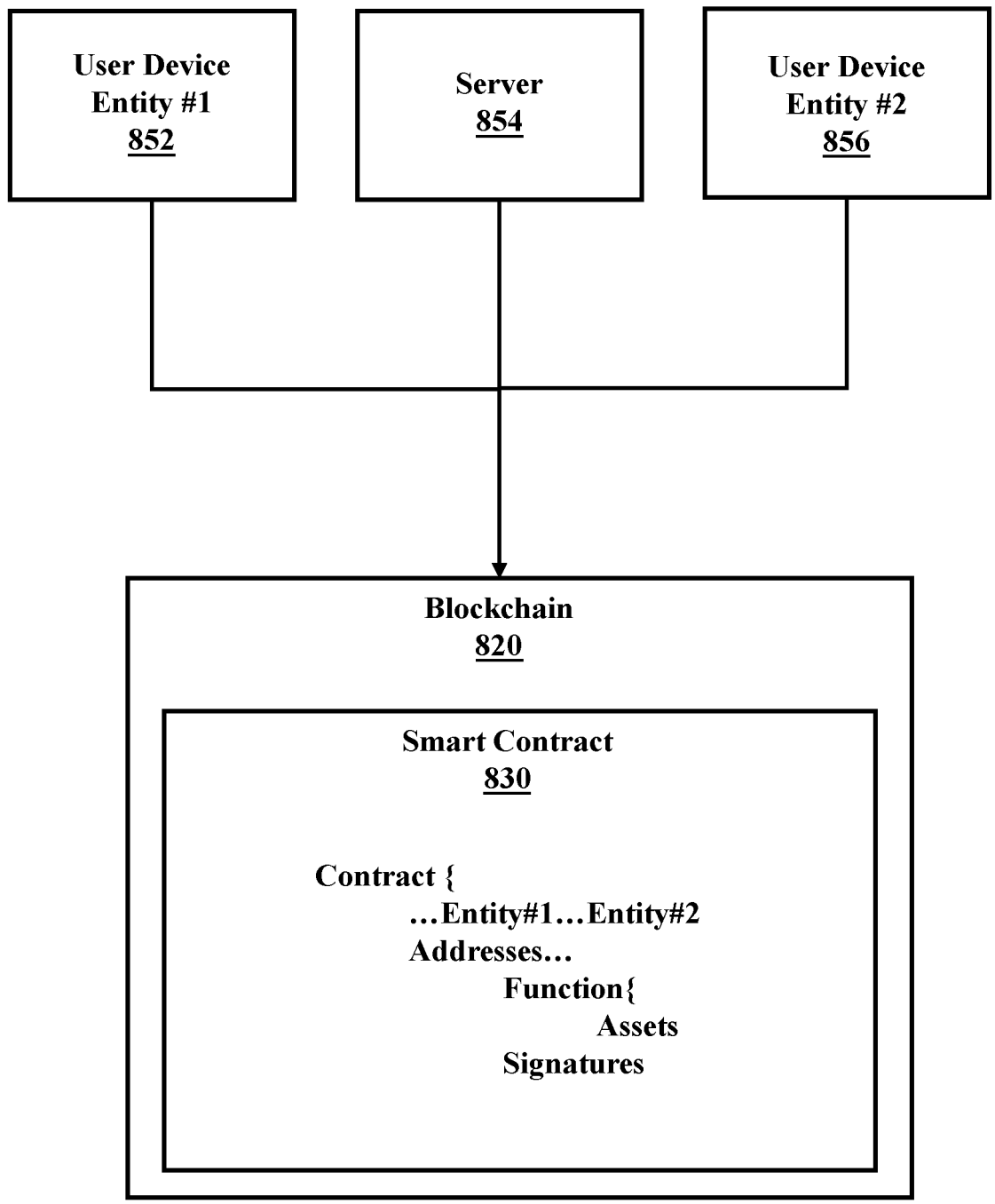
FIG. 8C illustrates a further example system configured to utilize a smart contract, generally designated 850, in accordance with at least one embodiment of the present disclosure.

FIG. 8C illustrates an example system configured to utilize a smart contract configuration among contracting parties and a mediating server configured to enforce the smart contract terms on the blockchain in accordance with embodiments of the present disclosure. Referring to FIG. 8C, the configuration 850 may represent a communication session, an asset transfer session or a process or procedure that is driven by a smart contract 830 which explicitly identifies one or more user devices 852 and/or 856. The execution, operations and results of the smart contract execution may be managed by a server 854. Content of the smart contract 830 may require digital signatures by one or more of the entities 852 and 856 which are parties to the smart contract transaction. The results of the smart contract execution may be written to a blockchain 820 as a blockchain transaction. The smart contract 830 resides on the blockchain 820 which may reside on one or more computers, servers, processors, memories, and/or wireless communication devices.

Figure 8D:
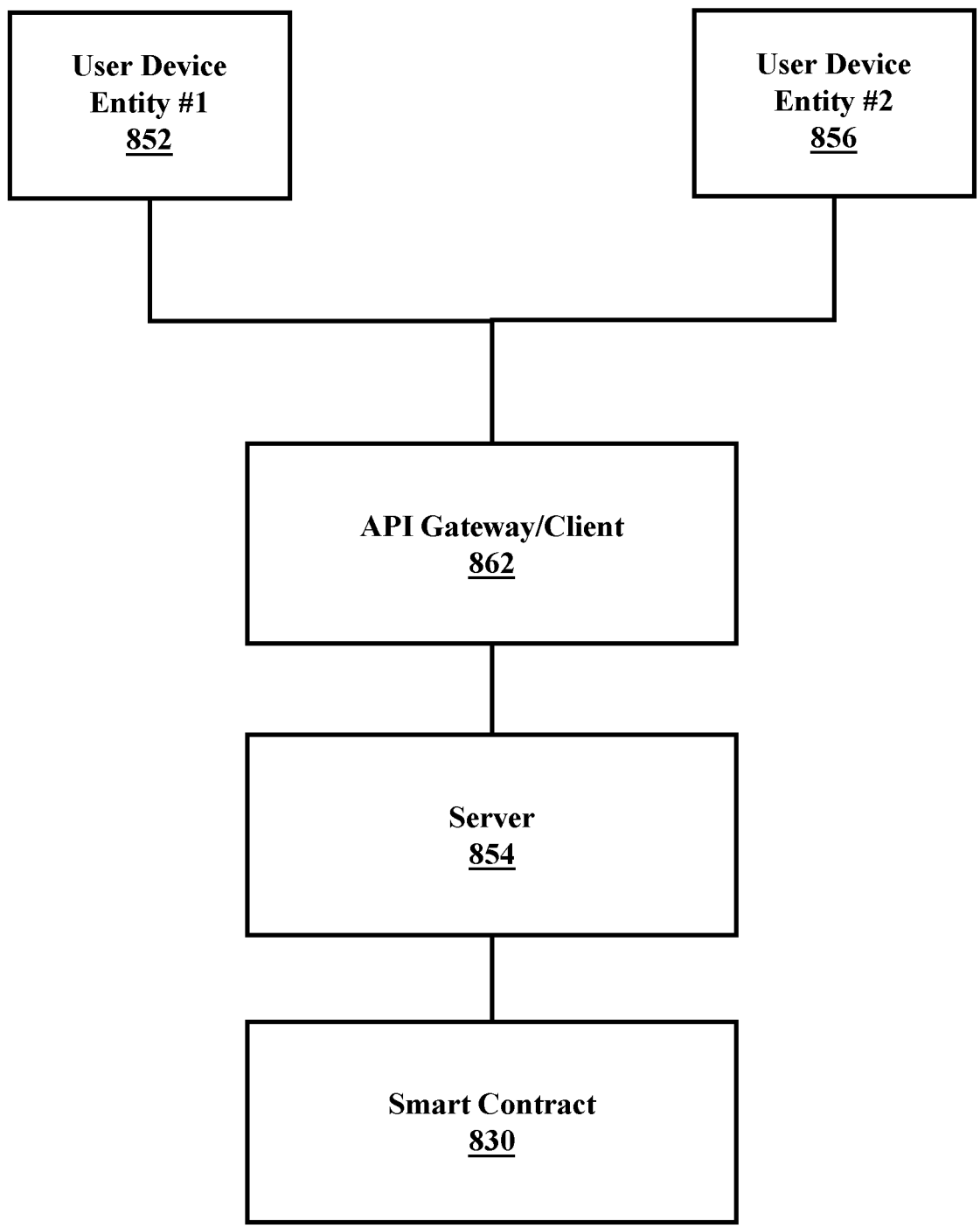
FIG. 8D illustrates yet another example system configured to utilize a blockchain, generally designated 860, in accordance with at least one embodiment of the present disclosure.

FIG. 8D illustrates a system 860 including a blockchain, in accordance with embodiments of the present disclosure. Referring to the example of FIG. 8D, an application programming interface (API) gateway 862 provides a common interface for accessing blockchain logic (e.g., smart contract 830 or other chaincode) and data (e.g., distributed ledger, etc.). In this example, the API gateway 862 is a common interface for performing transactions (e.g., invoke, queries, etc.) on the blockchain by connecting one or more entities 852 and 856 to a blockchain peer (e.g., server 854). Here, the server 854 is a blockchain network peer component that holds a copy of the world state and a distributed ledger allowing clients 852 and 856 to query data on the world state as well as submit transactions into the blockchain network where, depending on the smart contract 830 and license terms, authorized transactions will run the smart contract 830.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 9A:
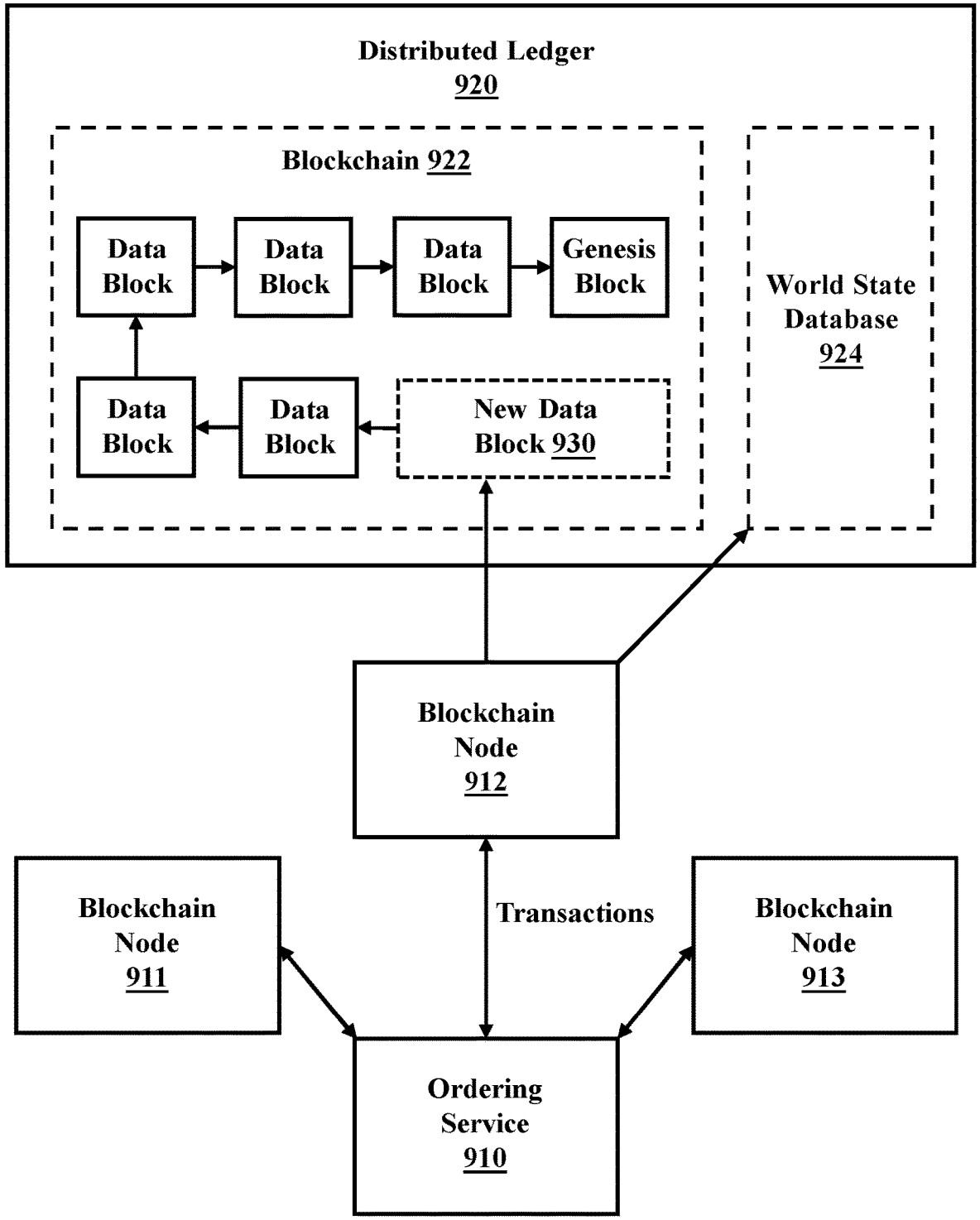
FIG. 9A illustrates a process for a new block being added to a distributed ledger, generally designated 900, in accordance with at least one embodiment of the present disclosure.
Figure 9B:
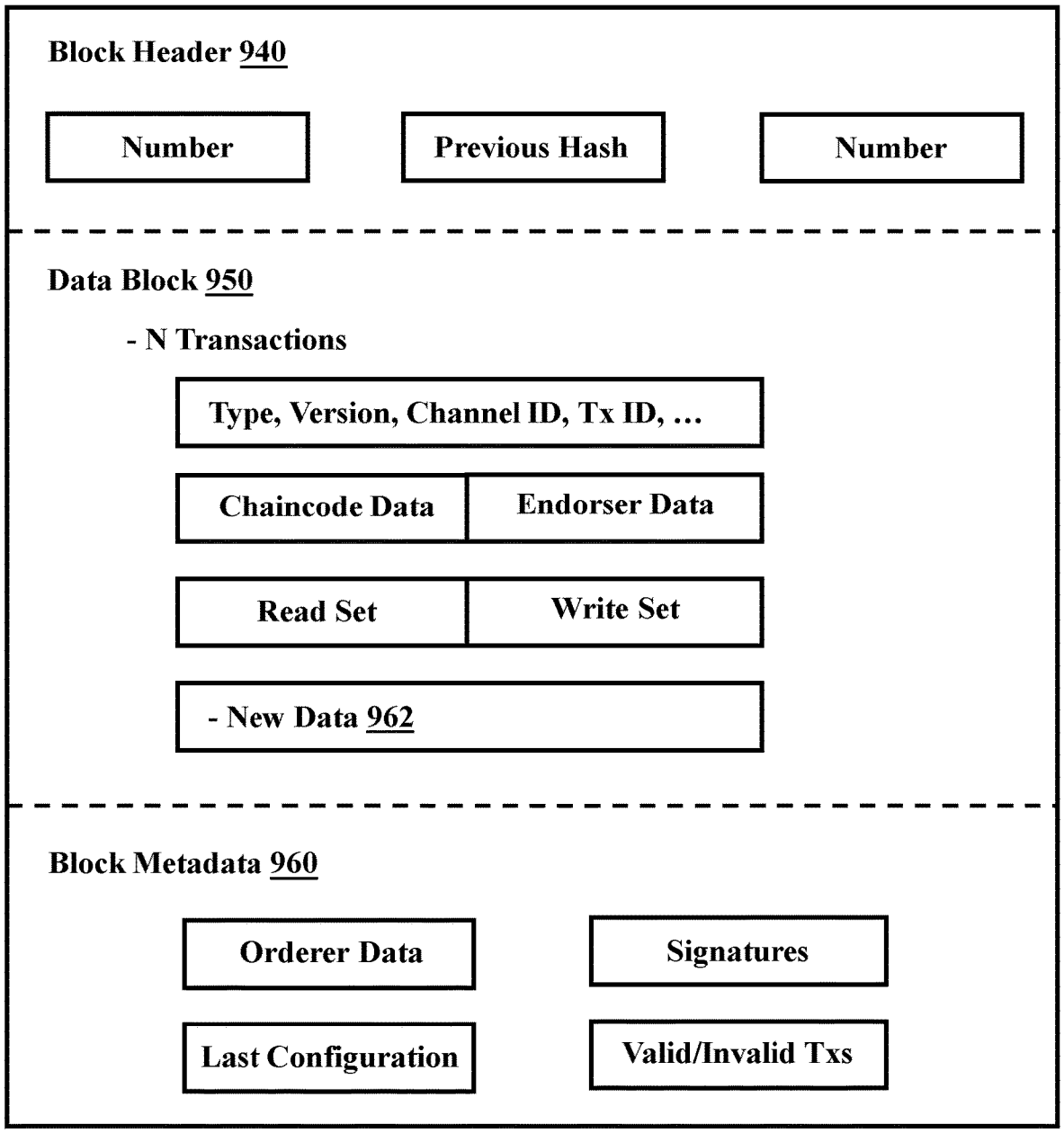
FIG. 9B illustrates contents of a new data block, generally designated 930, in accordance with at least one embodiment of the present disclosure.

FIG. 9A illustrates a process 900 of a new block being added to a distributed ledger 920, in accordance with embodiments of the present disclosure (e.g., when a new smart contract is generated, etc.), and FIG. 9B illustrates contents of a new data block structure 930 for blockchain, in accordance with embodiments of the present disclosure. The new data block 930 may contain document linking data.

Referring to FIG. 9A, clients (not shown) may submit transactions to blockchain nodes 911, 912, and/or 913. Clients may be instructions received from any source to enact activity on the blockchain 922. As an example, clients may be applications that act on behalf of a requester, such as a device, person or entity to propose transactions for the blockchain. The plurality of blockchain peers (e.g., blockchain nodes 911, 912, and/or 913) may maintain a state of the blockchain network and a copy of the distributed ledger 920. Different types of blockchain nodes/peers may be present in the blockchain network including nodes which simulate and authorize transactions proposed by clients; recommending nodes which utilize natural language processing techniques and recommend entities to be automatically contracted with users; and committing peers which validate transactions and commit transactions to the distributed ledger 920. In this example, the blockchain nodes 911, 912, and/or 913 may perform the role of endorser node, committer node, recommender node, or all three.

The distributed ledger 920 includes a blockchain 922 which stores immutable, sequenced records in blocks, and a state database 924 (current world state) maintaining a current state of the blockchain 922. One distributed ledger 920 may exist per channel and each peer maintains its own copy of the distributed ledger 920 for each channel of which they are a member. The blockchain 922 is a transaction log, structured as hash-linked blocks where each block contains a sequence of N transactions. Blocks may include various components such as shown in FIG. 9B. The linking of the blocks (shown by arrows in FIG. 9A) may be generated by adding a hash of a prior block's header within a block header of a current block. In this way, all transactions on the blockchain 922 are sequenced and cryptographically linked together preventing tampering with blockchain data without breaking the hash links. Furthermore, because of the links, the latest block in the blockchain 922 represents every transaction that has come before it. The blockchain 922 may be stored on a peer file system (local or attached storage), which supports an append-only blockchain workload.

The current state of the blockchain 922 and the distributed ledger 920 may be stored in the state database 924. Here, the current state data represents the latest values for all keys ever included in the chain transaction log of the blockchain 922. Chaincode invocations execute transactions against the current state in the state database 924. To make these chaincode interactions extremely efficient, the latest values of all keys are stored in the state database 924. The state database 924 may include an indexed view into the transaction log of the blockchain 922, it can therefore be regenerated from the chain at any time. The state database 924 may automatically get recovered (or generated if needed) upon peer startup, before transactions are accepted.

Nodes receive transactions from clients and authorize the transaction based on simulated results. Nodes hold smart contracts which simulate the transaction proposals. When a node validates ownership of a digital asset, the node creates a transaction endorsement which is a signed response from the node to the client application indicating the validation of the digital asset ownership. The method of validating a digital asset ownership depends on one or more of the liveness hash, nonce, private and public key pairs, which may be specified within chaincode. Different channels may have different licensing terms. Authorized transactions are forward by the client application to ordering service 910.

The ordering service 910 accepts authorized transactions, orders them into a block, and delivers the blocks to the committing peers. For example, the ordering service 910 may initiate a new block when a threshold of transactions has been reached, a timer times out, or another condition. In the example of FIG. 9A, blockchain node 912 is a committing peer that has received a new data block 930 for storage on blockchain 922. The first block in the blockchain may be referred to as a genesis block which includes information about the blockchain, its members, the data stored therein, etc.

The ordering service 910 may be made up of a cluster of orderers. The ordering service 910 does not process transactions, smart contracts, or maintain the shared ledger. Rather, the ordering service 910 may accept the authorized transactions and specifies the order in which those transactions are committed to the distributed ledger 920. The architecture of the blockchain network may be designed such that the specific implementation of 'ordering' becomes a pluggable component.

Transactions are written to the distributed ledger 920 in a consistent order. The order of transactions is established to ensure that the updates to the state database 924 are valid when they are committed to the network. Unlike a crypto-currency blockchain system where ordering occurs through the solving of a cryptographic puzzle, or mining, in this example the parties of the distributed ledger 920 may choose the ordering mechanism that best suits that network.

When the ordering service 910 initializes a new data block 930, the new data block 930 may be broadcast to committing peers (e.g., blockchain nodes 911, 912, and 913). When the transaction is authorized, the transaction is written to the blockchain 922 on the distributed ledger 920, and the state database 924 is updated with the write data from the read-write set. If a transaction fails, that is, if the committing peer finds that the read-write set does not match the current world state in the state database 924, the transaction ordered into a block will still be included in that block, but it will be marked as invalid, and the state database 924 will not be updated.

Referring to FIG. 9B, a new data block 930 (also referred to as a data block) that is stored on the blockchain 922 of the distributed ledger 920 may include multiple data segments such as a block header 940, block data 950, and block metadata 960. It should be appreciated that the various depicted blocks and their contents, such as new data block 930 and its contents shown in FIG. 9B are merely examples and are not meant to limit the scope of the example embodiments. The new data block 930 may store transactional information of N transaction(s) (e.g., 1, 10, 100, 500, 1000, 2000, 3000, etc.) within the data block 950. The new data block 930 may also include a link to a previous block (e.g., on the blockchain 922 in FIG. 9A) within the block header 940. In particular, the block header 940 may include a hash of a previous block's header. The block header 940 may also include a unique block number, a hash of the block data 950 of the new data block 930, and the like. The block number of the new data block 930 may be unique and assigned in various orders, such as an incremental/sequential order starting from zero.

The data block 950 may store transactional information of each transaction that is recorded within the new data block 930. For example, the transaction data may include one or more of a type of the transaction, a version, a timestamp, a channel ID of the distributed ledger 920, a transaction ID, an epoch, a payload visibility, a chaincode path (deploy tx), a chaincode name, a chaincode version, input (chaincode and functions), a client (creator) identify such as a public key and certificate, a signature of the client, signature of licensor, identities of licensors, a proposal hash, chaincode events, response status, namespace, a read set (list of key and version read by the transaction, etc.), a write set (list of key and value, etc.), a start key, an end key, a list of keys, a Merkle tree query summary, and the like. The transaction data may be stored for each of the N transactions.

In some embodiments, the data block 950 may also store new data 962 which adds additional information to the hash-linked chain of blocks in the blockchain 922. The additional information includes one or more of the steps, features, processes and/or actions described or depicted herein. Accordingly, the new data 962 can be stored in an immutable log of blocks on the distributed ledger 920. Some of the benefits of storing such new data 962 are reflected in the various embodiments disclosed and depicted herein. Although in FIG. 9B the new data 962 is depicted in the data block 950 but could also be located in the block header 940 or the block metadata 960. The new data 962 may include a document composite key that is used for linking the documents within an organization.

The block metadata 960 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the ordered metadata may be added by the ordering service 910. Meanwhile, a committer of the block (such as blockchain node 912) may add validity/invalidity information based on an endorsement policy, verification of read/write sets, and the like. The transaction filter may include a byte array of a size equal to the number of transactions in the data block 950 and a validation code identifying whether a transaction was valid/invalid.

Figure 9C:
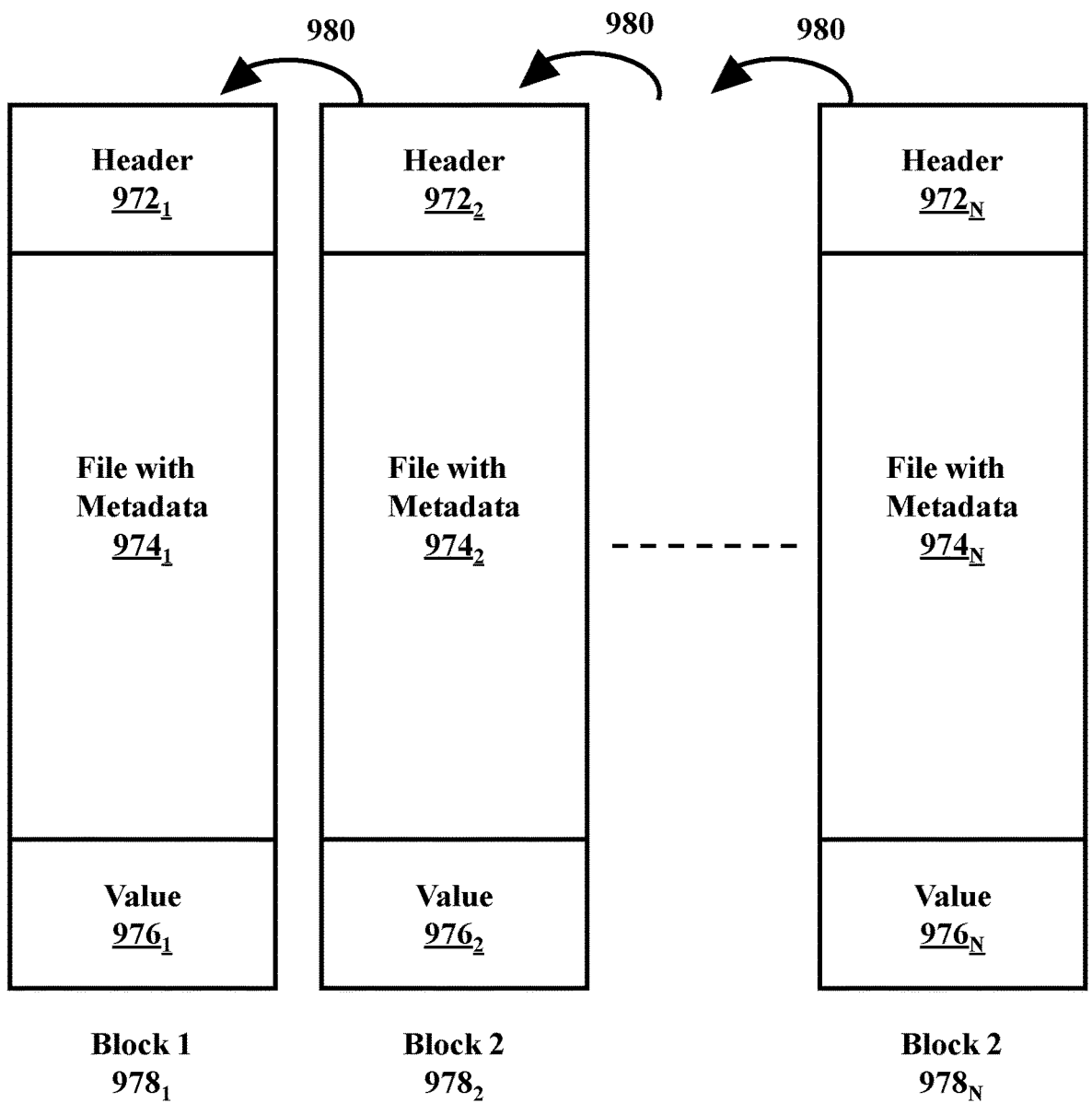
FIG. 9C illustrates a blockchain for digital content, generally designated 970, in accordance with at least one embodiment of the present disclosure.

FIG. 9C illustrates an embodiment of a blockchain 970 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken into consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 9C, the blockchain 970 includes a number of blocks $978_1$, $978_2$, . . . $978_N$ cryptographically linked in an ordered sequence, where N≥1. The encryption used to link the blocks $978_1$, $978_2$, . . . $978_N$ may be any of a number of keyed or un-keyed Hash functions. In one embodiment, the blocks $978_1$, $978_2$, . . . $978_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $978_1$, $978_2$, . . . $978_N$ may be cryptographically linked by a function that is different from a hash function. For purposes of illustration, the following description is made with reference to a hash function, e.g., SHA-2.

Each of the blocks $978_1$, $978_2$, . . . $978_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $978_1$ in the blockchain is referred to as the genesis block and includes the header $972_1$, original file $974_1$, and an initial value $976_1$. The hashing scheme used for the genesis block, and indeed in all subsequent blocks, may vary. For example, all the information in the first block $978_1$ may be hashed together and at one time, or each or a portion of the information in the first block $978_1$ may be separately hashed and then a hash of the separately hashed portions may be performed.

The header $972_1$ may include one or more initial parameters, which, for example, may include a version number, timestamp, nonce, root information, difficulty level, consensus protocol, duration, media format, source, descriptive keywords, and/or other information associated with original file $974_1$ and/or the blockchain. The header $972_1$ may be generated automatically (e.g., by blockchain network managing software) or manually by a blockchain participant. Unlike the header in other blocks $978_2$ to $978_N$ in the blockchain, the header $972_1$ in the genesis block does not reference a previous block, simply because there is no previous block.

The original file $974_1$ in the genesis block may be, for example, data as captured by a device with or without processing prior to its inclusion in the blockchain. The original file $974_1$ is received through the interface of the system from the device, media source, or node. The original file $974_1$ is associated with metadata, which, for example, may be generated by a user, the device, and/or the system processor, either manually or automatically. The metadata may be included in the first block $978_1$ in association with the original file $974_1$.

The value $976_1$ in the genesis block is an initial value generated based on one or more unique attributes of the original file $974_1$. In one embodiment, the one or more unique attributes may include the hash value for the original file $974_1$, metadata for the original file $974_1$, and other information associated with the file. In one implementation, the initial value $976_1$ may be based on the following unique attributes: 1) SHA-2 computed hash value for the original file; 2) originating device ID; 3) starting timestamp for the original file; 4) initial storage location of the original file; and 5) blockchain network member ID for software to currently control the original file and associated metadata.

The other blocks $978_2$ to $978_N$ in the blockchain also have headers, files, and values. However, unlike the first block $972_1$, each of the headers $972_2$ to $972_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 980, to establish an auditable and immutable chain-of-custody.

Each of the header 972₂ to 972_N in the other blocks may also include other information, e.g., version number, timestamp, nonce, root information, difficulty level, consensus protocol, and/or other parameters or information associated with the corresponding files and/or the blockchain in general.

The files 974₂ to 974_N in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks 976₂ to 976_N in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 9D illustrates an embodiment of a block which may represent the structure of the blocks in the blockchain 990 in accordance with one embodiment. The block, Block$_i$, includes a header 972$_i$ a file 974$_i$, and a value 976$_i$.

The header 972$_i$ includes a hash value of a previous block Block$_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file 974$_i$ includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use as digital evidence, for example, as described in connection with an embodiment discussed below. In addition to the metadata, each data may be tagged with reference REF$_1$, REF$_2$, . . . , REF$_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value 976$_i$ is a hash value or other value computed based on any of the types of information previously discussed. For example, for any given block Block$_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 990 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last (N$^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

What is claimed is:

1. A computer-implemented method for validating ownership of a digital asset, the computer-implemented method comprising:
    transmitting a public key, of a public key/private key pair, for encrypting a digital asset to an owner of the digital asset responsive to receiving a request for the public key;
    receiving from the owner of the digital asset, an encrypted digital asset and a first liveness hash, wherein the digital asset is encrypted using the public key, and the first liveness hash is generated based, at least in part, on the digital asset in an unencrypted form and a first nonce;
    generating in response to determining that the first liveness hash is valid, a digital asset record, wherein the digital asset record includes the encrypted digital asset and the first liveness hash;
    receiving a request for proof of ownership of the digital asset, the request including a second nonce;
    transmitting, to the owner, the second nonce for the proof of ownership of the digital asset;
    receiving, from the owner, an image ID associated with the digital image and a second liveness hash as the proof of ownership, the second liveness hash generated based, at least in part, on the digital asset and the second nonce, the digital asset being generated by transforming the encrypted digital asset using the private key; and
    matching the first liveness hash to the second liveness hash to validate the proof of ownership.

2. The computer implemented method of claim 1, wherein transmitting the public key for encrypting the digital asset further includes, generating a public/private key pair, wherein the public key of the public/private key pair is used to encrypt the digital asset, and a private key of the public/private key pair is used to decrypt the encrypted digital asset.

3. The computer-implemented method of claim 1, further comprising:
    storing the digital asset record in at least one of a distributed ledger or storage service external to a blockchain environment.

4. The computer-implemented method of claim 1, further comprising:
    responsive to receiving the encrypted digital asset, the first nonce, and the first liveness hash, determining the first liveness hash is valid by:
        transforming the encrypted digital asset back to an unencrypted digital asset using a private key associated with the digital asset;
        generating a third liveness hash based on the unencrypted digital asset and the first nonce; and
        matching the first liveness hash to the third liveness hash.

5. The computer-implemented method of claim 1, wherein:
    the request is received from a requesting entity directed to the owner of the digital asset; and
    the transmitting of the second nonce is performed responsive to receiving the request for the owner of the digital asset to provide proof of ownership of the digital asset.

6. The computer-implemented method of claim 1, wherein providing, by the owner, the proof of ownership includes retrieving, by the owner, the encrypted digital asset from the digital asset record using the image.

7. The computer-implemented method of claim 4, further comprising:
    responsive to validating the proof of ownership of the digital asset, transmitting an authentication that the owner of the digital asset is valid.

8. The computer-implemented method of claim 4, wherein determining the first liveness hash is valid further includes:
    determining a consensus of the first liveness hash using a smart contract executed in a trusted execution environment in a blockchain ledger.

9. The computer-implemented method of claim 1, further comprising:
    accessing a smart contract associated with the digital asset to verify that the first liveness hash matches the hash of the digital asset and the first nonce.

10. The computer-implemented method of claim 1, wherein the digital asset is an image or multimedia.

11. The computer-implemented method of claim 5, further comprising:
    transmitting information of authentic ownership from a smart contract TEE to a smart contract.

12. The computer-implemented method of claim 8, further comprising:
    transmitting information of authentic ownership from the smart contract to a corresponding registry.

13. A computer program product for validating ownership of a digital asset, the computer program product comprising one or more computer readable storage medium and program instructions stored on the one or more computer readable storage medium, the program instructions including instructions to:
    transmit a public key, of a public key/private key pair, for encrypting a digital asset to an owner of the digital asset responsive to receiving a request for the public key;
    receive from the owner of the digital asset, an encrypted digital asset and a first liveness hash, wherein the digital asset is encrypted using the public key, and the first liveness hash is generated based, at least in part, on the digital asset in an unencrypted form and a first nonce;
    generate in response to determining that the first liveness hash is valid, a digital asset record, wherein the digital asset record includes the encrypted digital asset and the first liveness hash;
    receive a request for proof of ownership of the digital asset, the request including a second nonce;
    transmit, to the owner, the second nonce for the proof of ownership of the digital asset;
    receive, from the owner, an image ID associated with the digital image and a second liveness hash as the proof of ownership, the second liveness hash generated based, at least in part, on the digital asset and the second nonce, the digital asset being generated by transforming the encrypted digital asset using the private key; and match the first liveness hash to the second liveness hash to validate the proof of ownership.

14. The computer program product of claim 13, wherein the instructions to transmit the public key for encrypting the digital asset further includes, instructions to generate a public/private key pair, wherein the public key of the public/private key pair is used to encrypt the digital asset, and a private key of the public/private key pair is used to decrypt the encrypted digital asset.

15. The computer program product of claim 13, the program instructions further comprising instructions to:
store the digital asset record in at least one of a distributed ledger or storage service external to a blockchain environment.

16. The computer program product of claim 13, the program instructions further comprising instructions to:
responsive to receiving the encrypted digital asset, the first nonce, and the first liveness hash, determine the first liveness hash is valid, the determining including instructions to:
transform the encrypted digital asset back to an unencrypted digital asset using a private key associated with the digital asset;
generate a third liveness hash based on the unencrypted digital asset and the first nonce; and
match first liveness hash to the third liveness hash.

17. The computer program product of claim 13, wherein:
the request is received from a requesting entity directed to the owner of the digital asset; and
the transmitting of the second nonce is performed responsive to receiving the request for the owner of the digital asset to provide proof of ownership of the digital asset.

18. A computer system for validating ownership of a digital asset, the computer system comprising:
one or more computer processors; and
one or more computer readable storage devices;
wherein:
the one or more computer processors are structured, located, connected, and/or programmed to run computer program instructions stored on the one or more computer readable storage devices; and
the computer program instructions which, when executed by the one or more computer processors, cause the one or more computer processors to validate ownership of a digital asset by:
transmitting a public key, of a public key/private key pair, for encrypting a digital asset to an owner of the digital asset responsive to receiving a request for the public key;
receiving from the owner of the digital asset, an encrypted digital asset and a first liveness hash, wherein the digital asset is encrypted using the public key, and the first liveness hash is generated based, at least in part, on the digital asset in an unencrypted form and a first nonce;
generating in response to determining that the first liveness hash is valid, a digital asset record, wherein the digital asset record includes the encrypted digital asset and the first liveness hash;
receiving a request for proof of ownership of the digital asset, the request including a second nonce;
transmitting, to the owner, the second nonce for the proof of ownership of the digital asset;
receiving, from the owner, an image ID associated with the digital image and a second liveness hash as the proof of ownership, the second liveness hash generated based, at least in part, on the digital asset and the second nonce, the digital asset being generated by transforming the encrypted digital asset using the private key; and
matching the first liveness hash to the second liveness hash to validate the proof of ownership.

19. A computer-implemented method for validating ownership of a digital asset, the computer-implemented method comprising:
transmitting a public key to an owner of a digital asset, the public key paired to a private key;
receiving, from the owner, an encrypted digital asset and a first liveness hash, the encrypted digital asset being the digital asset encrypted using the public key, the first liveness hash generated based, at least in part, on the digital asset and a first nonce;
generating a digital asset record, wherein the digital asset record includes the encrypted digital asset and the first liveness hash;
receiving a request for proof of ownership of the digital asset, the request including a second nonce;
transmitting, to the owner, the second nonce for the proof of ownership of the digital asset;
receiving, from the owner, an image ID associated with the digital image and a second liveness hash as the proof of ownership, the second liveness hash generated based, at least in part, on the digital asset and the second nonce, the digital asset being generated by transforming the encrypted digital asset using the private key; and
matching the first liveness hash to the second liveness hash to validate the proof of ownership.

20. The computer-implemented method of claim 19, further comprising:
storing the digital asset record in at least one of a distributed ledger or storage service external to a blockchain environment.

21. The computer-implemented method of claim 19, further comprising:
responsive to receiving the encrypted digital asset, the first nonce, and the first liveness hash, determining the first liveness hash is valid by:
transforming the encrypted digital asset back to the digital asset using the private key;
generating a third liveness hash based on the digital asset, transformed from the encrypted digital asset, and the first nonce; and
matching the first liveness hash, received with the encrypted digital asset, to the third liveness hash.

22. The computer-implemented method of claim 21, wherein determining the first liveness hash is valid includes:
determining a consensus of the first liveness hash using a smart contract executed in a trusted execution environment in a blockchain ledger.

* * * * *